US 12,250,289 B2

United States Patent
Hoshino et al.

(10) Patent No.: US 12,250,289 B2
(45) Date of Patent: Mar. 11, 2025

(54) COMMUNICATION CONTROL DEVICE, COMMUNICATION CONTROL METHOD, AND RELAY SERVER

(71) Applicant: DENSO CORPORATION, Kariya (JP)

(72) Inventors: Masayuki Hoshino, Kariya (JP); Keisuke Ikushima, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 18/325,282

(22) Filed: May 30, 2023

(65) Prior Publication Data
US 2023/0300226 A1 Sep. 21, 2023

Related U.S. Application Data

(63) Continuation of application No. PCT/JP2021/043625, filed on Nov. 29, 2021.

(30) Foreign Application Priority Data

Dec. 3, 2020 (JP) .................. 2020-201138

(51) Int. Cl.
H04L 69/22 (2022.01)
H04L 61/2514 (2022.01)
H04L 69/16 (2022.01)

(52) U.S. Cl.
CPC .......... H04L 69/22 (2013.01); H04L 61/2514 (2013.01); H04L 69/16 (2013.01)

(58) Field of Classification Search
CPC ..... H04L 61/2514; H04L 67/12; H04L 67/01; H04L 69/22; H04L 69/16; H04W 48/18
See application file for complete search history.

(56) References Cited

U.S. PATENT DOCUMENTS

2006/0193282 A1* 8/2006 Ikawa .................. H04L 67/12
370/428
2014/0162623 A1* 6/2014 Nagai ................ G01C 21/3661
455/566
2016/0248816 A1 8/2016 Nakahara
(Continued)

FOREIGN PATENT DOCUMENTS

FR          3095733 A1      11/2020
JP      2006088829 A       4/2006
(Continued)

Primary Examiner — Jungwon Chang
(74) Attorney, Agent, or Firm — Harness, Dickey & Pierce, P.L.C.

(57) ABSTRACT

A communication control device: transmits, from an application to a wireless communication device used in a vehicle, a start request of data communication between the application and an external device; acquire a communication condition related to the data communication between the application and the external device from the application; determines whether the data communication satisfying the communication condition is possible; sets a communication path from the application to the external device and sets a source port number to the request source when the data communication is determined to be possible; notifies the application of path information including the source port number; and performs the data communication between the application and the external device using the source port number.

11 Claims, 9 Drawing Sheets

(56) References Cited

U.S. PATENT DOCUMENTS

| | | |
|---|---|---|
| 2017/0093985 A1 | 3/2017 | Kouno |
| 2019/0068718 A1* | 2/2019 | Lee .................. H04L 67/12 |
| 2019/0268740 A1* | 8/2019 | Lei .................. H04W 48/18 |
| 2020/0007661 A1* | 1/2020 | Kim .................. H04L 67/01 |
| 2021/0011709 A1* | 1/2021 | Itatsu .................. B60R 16/02 |
| 2022/0043924 A1* | 2/2022 | Hu .................. H04L 63/0876 |
| 2022/0070758 A1* | 3/2022 | Bonnah .................. H04L 47/70 |
| 2022/0078863 A1 | 3/2022 | Gupta |
| 2022/0210688 A1* | 6/2022 | Baglin .................. H04W 28/0268 |
| 2022/0239528 A1* | 7/2022 | Yamamoto .................. H04L 12/40 |

FOREIGN PATENT DOCUMENTS

| | | |
|---|---|---|
| JP | 2014110493 A | 6/2014 |
| JP | 2016158091 A | 9/2016 |
| JP | 2017068400 A | 4/2017 |
| JP | 2019079330 A | 5/2019 |
| WO | WO-2020150231 A1 | 7/2020 |

\* cited by examiner

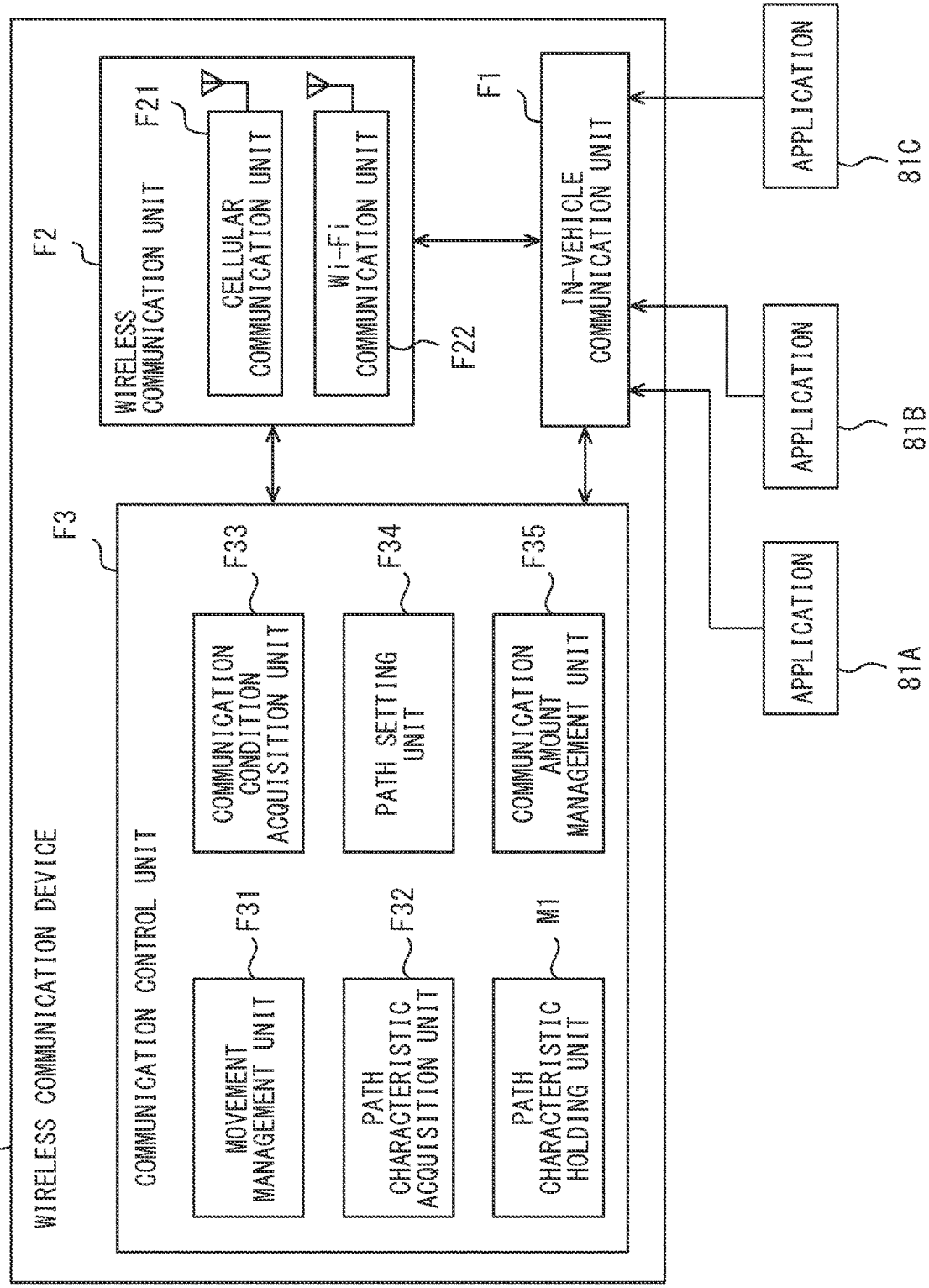

FIG. 5

| ITEM | CONTENT | SET VALUE EXAMPLE |
|---|---|---|
| ALLOWABLE WAITING TIME | ALLOWABLE WAITING TIME UNTIL START OF COMMUNICATION | 1d, 1h, 10min, 3s |
| ALLOWABLE RTT | ALLOWABLE RESPONSE DELAY TIME | 10s, 1s, 100ms, 1ms |
| MINIMUM BANDWIDTH | MINIMUM VALUE OF BANDWIDTH TO BE ENSURED | 100Kbps, 1Mbps, 10Mbps |
| ASSUMED DATA SIZE | ASSUMED VALUE OF DATA SIZE | 10kB, 100MB, 1GB |
| DATA HOLDABLE TIME | REMAINING TIME THAT CAN BE CACHED | 1min, 10min, 1h, 1d |
| CHARGING TARGET | CHARGING DESTINATION OF COMMUNICATION COST | User, OEM |
| DATA LOSS ALLOWABILITY | PACKET LOSS ALLOWED? | 1: NG<br>0: OK |
| PRIVACY | PRIVACY INFO INCLUDED IN COMMUNICATION CONTENT? | 1: INCLUDED<br>0: NOT INCLUDED |
| URGENCY | URGENT OR NOT? | 1: URGENT<br>0: NOT URGENT |
| CONFIDENTIALITY | WHETHER COMMUNICATION CONTENT INCLUDES CONFIDENTIAL INFO? | 1: INCLUDED<br>0: NOT INCLUDED |
| CONTROL AVAILABILITY | WHETHER COMMUNICATION CONTENT IS USED FOR VEHICLE CONTROL? | 1: USED<br>0: NOT USED |

FIG. 11
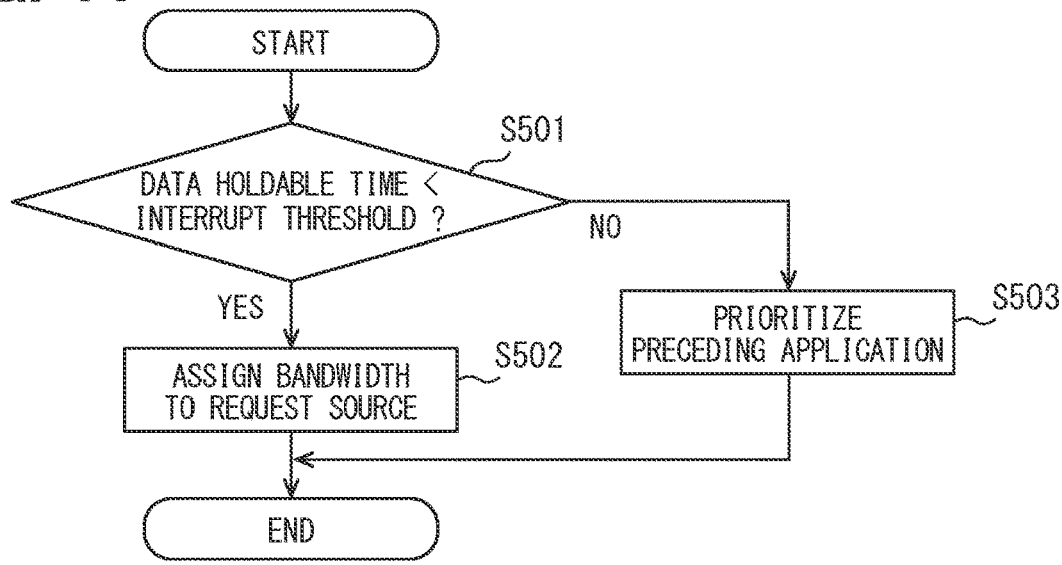
FIG. 12
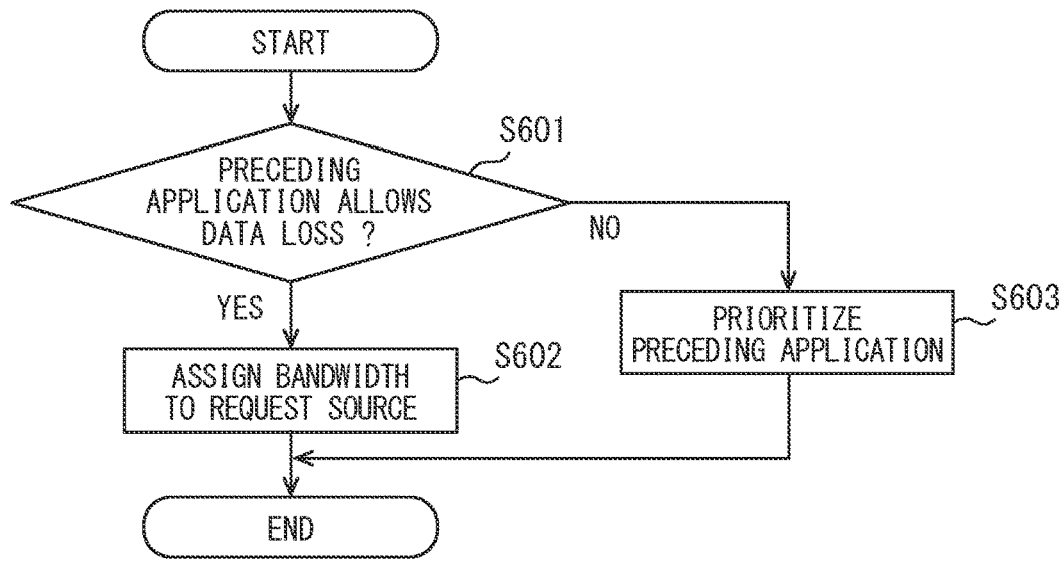
FIG. 13
| App | SOURCE PORT | FIRST LINE (APN1) | SECOND LINE (APN2) | Wi-Fi LINE |
|---|---|---|---|---|
| App1 | port_nnnn | 1GB | 2GB | 4GB |
| App2 | port_mmmm | 2.5GB | 0.7GB | 0.5GB |
| ... | ... | ... | ... | ... |

COMMUNICATION CONTROL DEVICE, COMMUNICATION CONTROL METHOD, AND RELAY SERVER

CROSS REFERENCE TO RELATED APPLICATIONS

The present application is a continuation application of International Patent Application No. PCT/JP2021/043625 filed on Nov. 29, 2021, which designated the U.S. and claims the benefit of priority from Japanese Patent Application No. 2020-201138 filed on Dec. 3, 2020. The entire disclosures of all of the above applications are incorporated herein by reference.

TECHNICAL FIELD

The present disclosure relates to relaying of communication between an application used in a vehicle and a server.

BACKGROUND

Conventionally, multiple electronic control units (ECUs) included in a vehicle perform data communication with a server disposed outside the vehicle via a communication device.

SUMMARY

The present disclosure provides a communication control device. The communication control device: transmits, from an application to a wireless communication device used in a vehicle, a start request of data communication between the application and an external device; acquire a communication condition related to the data communication between the application and the external device from the application; determines whether the data communication satisfying the communication condition is possible; sets a communication path from the application to the external device and sets a source port number to the request source when the data communication is determined to be possible; notifies the application of path information including the source port number; and performs the data communication between the application and the external device using the source port number.

BRIEF DESCRIPTION OF DRAWINGS

Objects, features and advantages of the present disclosure will become apparent from the following detailed description made with reference to the accompanying drawings.

FIG. 4 is a block diagram illustrating functions of a wireless communication device.

FIG. 5 is a diagram illustrating an example of items that may be included in a communication condition.

FIG. 11 is a flowchart of a process for determining whether to maintain the communication of the preceding application using a data holdable time.

FIG. 12 is a flowchart of a process for determining whether to maintain the communication of the preceding application using a data loss flag.

FIG. 13 is a diagram illustrating an operation of a communication amount management unit.

DETAILED DESCRIPTION

Figure 1:
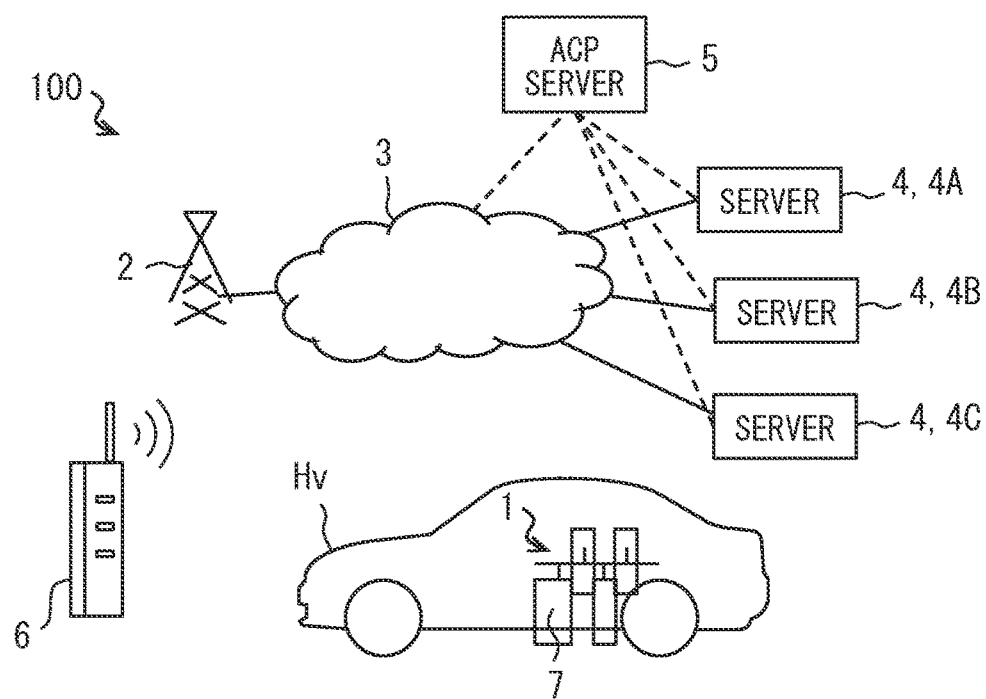
FIG. 1 is a diagram illustrating an overall configuration of a vehicle communication system.

Before describing embodiments of the present disclosure, a related art will be described first. As described above, when multiple ECUs of vehicle perform data communication with a server disposed outside the vehicle via a communication device, the communication device is configured to adjust a transmission order of data based on a priority set in advance for each ECU in order to improve efficiency of data transmission from the communication device to the server. Specifically, data input from an ECU having a high priority is transmitted to the server prior to data from an ECU having a relatively low priority.

In this configuration, a packet transmission order for each application is adjusted based on a preset priority. However, there is a difficult in how to dynamically control an assignment state of a communication line/communication bandwidth for each application is not considered.

As a method for dynamically controlling an assignment state of a communication line/communication bandwidth for each application, for example, a method for setting a priority for each application in advance and adjusting an assignment state for each application using the priority is considered.

However, in the future, an application installed in the vehicle may be dynamically changed. It is assumed that a combination of applications installed in each vehicle is different. Therefore, it is difficult to register a priority order for each application in advance in a communication control device that controls wireless communication. In addition, for each application, for example, characteristics and settings (that is, communication conditions) related to data communication, such as a requested communication speed, latency, a security level, and an upper limit value of an allowable communication fee, may be different. Therefore, it is difficult to appropriately control the assignment state of the communication line for each application with one parameter called priority.

According to an aspect of the present disclosure, a communication control device, which is capable of using at least one communication line and controls communication between each of a plurality of applications executed in a vehicle and an external device using the at least one communication line, is provided. The communication control device includes: a request reception unit receiving, from one of the plurality of applications, a start request of communication of data between the one of the plurality of applications and the external device; a communication condition acquisition unit acquiring, from the one of the plurality of applications corresponding to a request source of the start request, a communication condition indicating a condition related to the communication of data between the one of the plurality of applications and the external device; a communication possibility determination unit determining whether the communication of data satisfying the communication condition is possible based on at least one of a state of the at least one communication line or a communication condition of a preceding application which is another one of the plurality of applications being executed; a path setting unit setting a communication path from the request source to the external device in response to the communication possibility determination unit determining that the communication between the request source and the external device is possible; and a response unit returning information indicating a determination result of the communication possibility determination unit to the request source. The setting of the communication path includes assignment of a source port number to the request source. The response unit notifies the request source of the source port number when the communication possibility determination unit determines that the communication of data is possible.

According to the above configuration, whether communication of data satisfying the communication condition of request source can be performed is determined based on the communication condition notified by the application, which is a request source of communication start, a state of communication line, and the communication condition of preceding application, instead of a preset priority. When it is determined that the communication can be performed, the communication path for the request source is set based on the communication condition of the request source. According to such a configuration, even when an application used in the vehicle is changed or a combination of applications installed in each vehicle is different, it is possible to set a communication path according to the communication characteristics of each application.

According to another aspect of the present disclosure, a communication control method is provided. The communication control method controls an execution state of communication performed, using at least one communication line, between an application used in a vehicle and an external device. The external device is a communication device located outside the vehicle. The communication control method includes: transmitting, from the application to a wireless communication device used in the vehicle, a start request of data communication between the application and the external device; acquiring, by the wireless communication device, a communication condition indicating a condition related to the data communication between the application and the external device from the application which is a request source of the start request; determining, by the wireless communication device, whether the data communication satisfying the communication condition of the request source is possible based on at least one of a state of the at least one communication line or a communication condition of a preceding application, which is another application being performed; setting, by the wireless communication device, a communication path from the request source to the external device and setting a source port number to the request source in response to determination that the data communication between the request source and the external device is possible; notifying, by the wireless communication device, the request source of path information including at least the source port number as information about the communication path from the request source to the external device; and performing, by the request source, cryptographic communication between the application and the external device using the source port number.

According to another aspect of the present disclosure, a relay server, which relays data communication between an application used in a vehicle and an external device, is provided. The external device operates in cooperation with the application. The data communication with the application is performed via a wireless communication device equipped to the vehicle, and the wireless communication device selectively using, from a plurality of predetermined communication lines, a communication line that satisfies a communication condition specified by the application. The relay server includes: a path information acquisition unit acquiring, from the wireless communication device, communication path information in association with an application identifier, wherein the communication path information includes a source port number assigned to the application, and the application identifier indicates identification information of the application; and a communication amount management unit managing, in association with the application identifier or the source port number, an amount of data for each of the plurality of predetermined communication lines transmitted and received using the source port number assigned to the application.

Hereinafter, an embodiment of the present disclosure will be described below with reference to the drawings. FIG. 1 is a diagram illustrating an example of a schematic configuration of a vehicle communication system 100 according to the present disclosure. The vehicle communication system 100 provides wireless communication in accordance with, for example, long term evolution (LTE). Portions not described in the embodiment are assumed to be implemented by a method defined in an LTE standard. The vehicle communication system 100 may provide wireless communication in accordance with a 3G standard, a 4G standard, a 5G standard, or the like. Hereinafter, LTE, 3G, 4G, 5G, and the like are collectively referred to as LTE or the like. The following embodiment can be appropriately modified and implemented in accordance with 3G, 4G, 5G, or the like.

(Overall Configuration)

As illustrated in FIG. 1, the vehicle communication system 100 includes an in-vehicle communication system 1, a cellular base station 2, a core network 3, servers 4, and an ACP server 5. The vehicle communication system 100 may include a Wi-Fi base station 6 as any element. Although only one cellular base station 2 and one Wi-Fi base station 6 are illustrated in FIG. 1, there may be multiple cellular base stations 2 and Wi-Fi base stations 6.

The in-vehicle communication system 1 is a communication system built in a vehicle Hv. As described below, the in-vehicle communication system 1 includes multiple applications (hereinafter, referred to as applications 81) and performs data communication with the multiple servers 4 corresponding to the applications 81, respectively. The servers 4 correspond to an external device.

Although only one vehicle Hv in which the in-vehicle communication system 1 is installed is illustrated in FIG. 1, there may be multiple vehicles Hv in the entire system. Specifications of an electronic control unit (ECU) installed in each vehicle Hv and versions of the applications 81 installed in the ECU may be different. The specifications of the ECU may include an operating system (OS) and start states of the applications 81 when a vehicle power supply is turned off.

The in-vehicle communication system 1 is capable of using multiple types of wireless communication services (in other words, communication lines) having different communication systems, such as a cellular line and a Wi-Fi line. The cellular line here indicates a communication line via the cellular base station 2, in other words, a communication line in accordance with the LTE/4G/5G standard. The Wi-Fi line refers to a communication line through the Wi-Fi base station 6. The Wi-Fi line can be performed when the vehicle Hv is present in a communication area of the Wi-Fi base station 6.

The cellular base station 2 is a facility that transmits and receives radio signals in accordance with a standard such as the LTE or the like to and from the in-vehicle communication system 1. The cellular base station 2 is also referred to as an evolved NodeB (eNB). The cellular base station 2 may be a next generation NodeB (gNB) used in 5G. The cellular base station 2 is disposed for each predetermined cell. The cell refers to a communicable range covered by one cellular base station 2. The cellular base station 2 itself may be referred to as a cell.

The cellular base station 2 is connected to the core network 3 via an access line such as an internet protocol (IP) network. The cellular base station 2 relays traffic between a wireless communication device 7 and the core network 3. The cellular base station 2 performs, for example, assignment of transmission opportunities based on a request from the in-vehicle communication system 1. Each transmission opportunity includes a frequency band, a time, a modulation system, and the like that are available for data transmission.

The cellular base station 2 transmits various reference signals (RS) as needed. Examples of the reference signals include a cell-specific RS (CRS), a sounding RS (SRS), a CSI-reference signal (CSI-RS), and a demodulation RS (DMRS). The CRS is a control signal for cell selection. The SRS, the CSI-RS, and the DMRS are RS's for estimating a state of a transmission line in an uplink direction or a downlink direction. Information indicating the transmission line state is also referred to as channel state information (CSI). The various RS's correspond to a control signal for the wireless communication device 7 to evaluate reliability of the communication line in one aspect. Here, the reliability of communication line refers to, for example, a communication speed, latency, a packet loss rate. The various RS's may be transmitted periodically or may be transmitted in response to an occurrence of a predetermined event. The transmission of the RS's may be triggered by, for example, receiving an inquiry from user equipment (UE) or when an occurrence frequency of a communication error exceeds a predetermined threshold.

The core network 3 is a so-called evolved packet core (EPC). The core network 3 provides functions such as user authentication, contract analysis, data packet transfer path setting, quality of service (QoS) control, and the like. The core network 3 may include, for example, a public communication network provided by a communication carrier, such as an IP network or a cellular phone network.

The core network 3 includes, for example, an MME, an S-GW, a P-GW, and a PCRF. The MME is an abbreviation of mobility management entity, and is in charge of management of UE in a cell and control of the cellular base station 2. The MME plays a role as a gateway of control signals between the cellular base station 2 and the serving gateway (S-GW), for example. The S-GW is a configuration corresponding to a gateway of data from the UE. The P-GW is an abbreviation of packet data network gateway and corresponds to a gateway for connecting to a packet data network (PDN) such as the Internet. The P-GW assigns an IP address and transfers a packet to the S-GW. The PCRF is an abbreviation of policy and charging rules function, and is a logic node that controls QoS and charging for user data transfer. The PCRF includes a database including a network policy and a charging rule.

In addition, the core network 3 may include a home location register (HLR)/home subscriber server (HSS), or the like. Names, combinations, and the like of devices constituting the core network 3 can be appropriately changed to correspond to communication standards adopted by the vehicle communication system 100, such as 5G. A functional arrangement in the core network 3 can be appropriately changed. For example, another device may have a function provided by the PCRF.

Hereinafter, for example, when the devices constituting the core network 3 such as the MME and the S-GW are not distinguished from the cellular base station 2, the devices are also referred to as a network-side device. For example, a communication facility such as the PCRF may be disposed for each access point name (APN) or each telecommunications carrier. The APN is an identifier of a communication service in one aspect. The APN is associated with a communication carrier (so-called carrier) that provides a communication service. In the core network 3, the transfer path for data is different for each APN.

The servers 4 are facilities that perform a process for providing a predetermined service by performing data communication with a vehicle. The application 81 corresponding to each server 4 is installed in the vehicle Hv. Each server 4 illustrated in FIG. 1 corresponds to an application server that performs a process corresponding to each of the multiple applications 81 used in the vehicle Hv.

The ACP server 5 is a server that relays communication between the vehicle Hv and the server 4. The ACP server 5 may also be referred to as a relay server. The ACP in a member name is an abbreviation of automotive communication platform. The ACP server 5 integrally performs communication connection control between the vehicle Hv and the server 4 and monitoring of a communication state.

Figure 2:
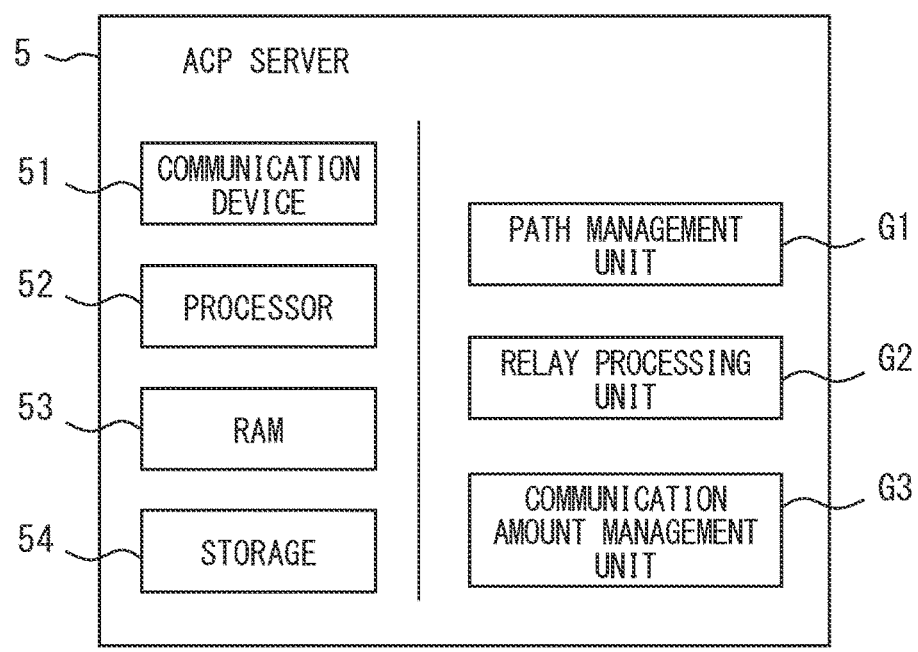
FIG. 2 is a block diagram illustrating a configuration of an ACP server.

As illustrated in FIG. 2, the ACP server 5 is implemented using a communication device 51, a processor 52, a RAM 53, and a storage 54. The communication device 51 is configured to perform communication with the wireless communication device 7 or various servers 4. The processor 52 is, for example, a calculation core such as a central processing unit (CPU). The RAM 53 is a rewritable volatile memory. The storage 54 is a rewritable non-volatile memory. The storage 54 stores a relay server program, which is a program for relaying data communication between the wireless communication device 7 and the server 4.

The ACP server 5 includes, for example, a path management unit G1, a relay processing unit G2, and a communication amount management unit G3 as functional modules that are implemented by the processor 52 executing the relay server program stored in the storage 54. The path management unit G1 is configured to manage communication path information from the wireless communication device 7 to the various servers 4. Here, the communication path information includes, for example, a so-called 5-taple, such as a source IP address, a source port number, a destination IP address, a destination port number, and a protocol number.

The wireless communication device 7 assigns a unique number to each application 81 as the source port number. The port number can be expressed by, for example, a 16-bit numerical value. Each source port number is stored in association with an application ID (application identifier) which is identification information for each application 81. The source port number may also be referred to as a transmission source port number. The path management unit G1 acquires communication path information by exchanging control signals with the wireless communication device 7 and the server 4. The ACP server 5 serving as the path management unit G1 notifies the server 4 of information necessary for communication, such as the source port number assigned to the application 81. The path management unit G1 corresponds to a path information acquisition unit.

The relay processing unit G2 transfers data transmitted from the wireless communication device 7 to the server 4 determined in accordance with destination information described in a header or the like, based on the communication path information acquired by the path management unit G1. The data transmitted from the server 4 is transferred to the wireless communication device 7.

The communication amount management unit G3 manages a communication amount for each application 81 using the source port number and the application ID for each application 81. That is, an amount of data exchanged using the same source port is managed separately for each line used for communication. Since the application 81 and the source port are in one-to-one correspondence, a total amount of data communication via a certain source port corresponds to a communication amount of the application 81 associated with the source port. According to a configuration in which the communication amount of the application 81 is managed separately for each communication line, a communication fee for each application 81 can be calculated separately as described later.

In addition, the ACP server 5 may be configured to perform not only a communication relay function but also, for example, a process for authenticating the server 4 and the vehicle Hv. Each server 4 may have functions provided by the ACP server 5. The ACP server 5 may be integrated with the server 4. The ACP server 5 can be interpreted as one type of the server 4 disposed outside the vehicle Hv. In addition, the ACP server 5 may be any element and may be omitted. That is, the vehicle Hv and the server 4 may be configured to perform data communication without passing through the ACP server 5.

The Wi-Fi base station 6 is a communication facility for forming a wireless local area network (LAN) in accordance with Wi-Fi (registered trademark). As a Wi-Fi standard, various standards such as IEEE 802.11n, IEEE 802.11ac, and IEEE 802.11ax (so-called Wi-Fi 6) can be adopted. The Wi-Fi base station 6 is disposed as infrastructure equipment at any location by various service providers. The Wi-Fi according to the present disclosure refers to Wi-Fi available for the wireless communication device 7, such as free Wi-Fi, or Wi-Fi for which a user or a vehicle manufacturer has concluded a usage contract.

(Example of Server 4)

A server 4A is, for example, the server 4 that distributes dynamic traffic information or quasi-dynamic traffic information (hereinafter, referred to as control support information) serving as a reference of the control of the vehicle Hv. The control support information is, for example, information indicating a current position, a travel speed, a traveling direction, and the like of another moving object present in the periphery of the vehicle. The control support information may be, for example, information on a quasi-dynamic map element indicating a position and a type of an obstacle in traveling, such as a section in which traffic regulation is performed, a tail position of a traffic congestion, a position of an on-road dropped object, and the like. The control support information may be information indicating a position and a lighting state of a traffic light present in front of the vehicle Hv, and information indicating a traveling trajectory according to a traveling direction in an intersection. Such a server 4A corresponds to the server 4 corresponding to an advanced driver-assistance systems (ADAS) application.

A server 4B is a server that distributes map data stored in a predetermined database based on a request from the vehicle Hv. The map data distributed by the server 4B may be high accuracy map data or navigation map data. The high accuracy map data corresponds to map data indicating a structure of a road, position coordinates of a feature disposed along the road, and the like with accuracy that can be used for autonomous driving. The navigation map data is map data for navigation, and corresponds to map data having relatively lower accuracy than the high accuracy map data. The server 4B may be a server that generates and updates the map data based on probe data uploaded from the vehicle Hv. Such a server 4B corresponds to the server 4 corresponding to a map-based application that handles the map data. The map-based application can include a navigation application that performs path guidance using the map data.

A server 4C is, for example, the server 4 that transmits music data stored in a cloud to the vehicle Hv. Such a server 4C corresponds to the server 4 corresponding to a music application that reproduces music in the vehicle Hv.

Various servers/centers can be adopted as the server 4. The vehicle communication system 100 may include, as the server 4, a remote control server that remotely controls the vehicle Hv. The remote control server displays, on a predetermined display, vehicle information transmitted from the vehicle Hv, such as an on-board camera image, a vehicle speed, and a current position, and transmits, to the vehicle Hv, an operation signal input by an operator to an input device. Here, the operator refers to a person who has an authority to control the vehicle Hv by remote control from an outside of the vehicle.

(Configuration of In-Vehicle Communication System 1)

Figure 3:
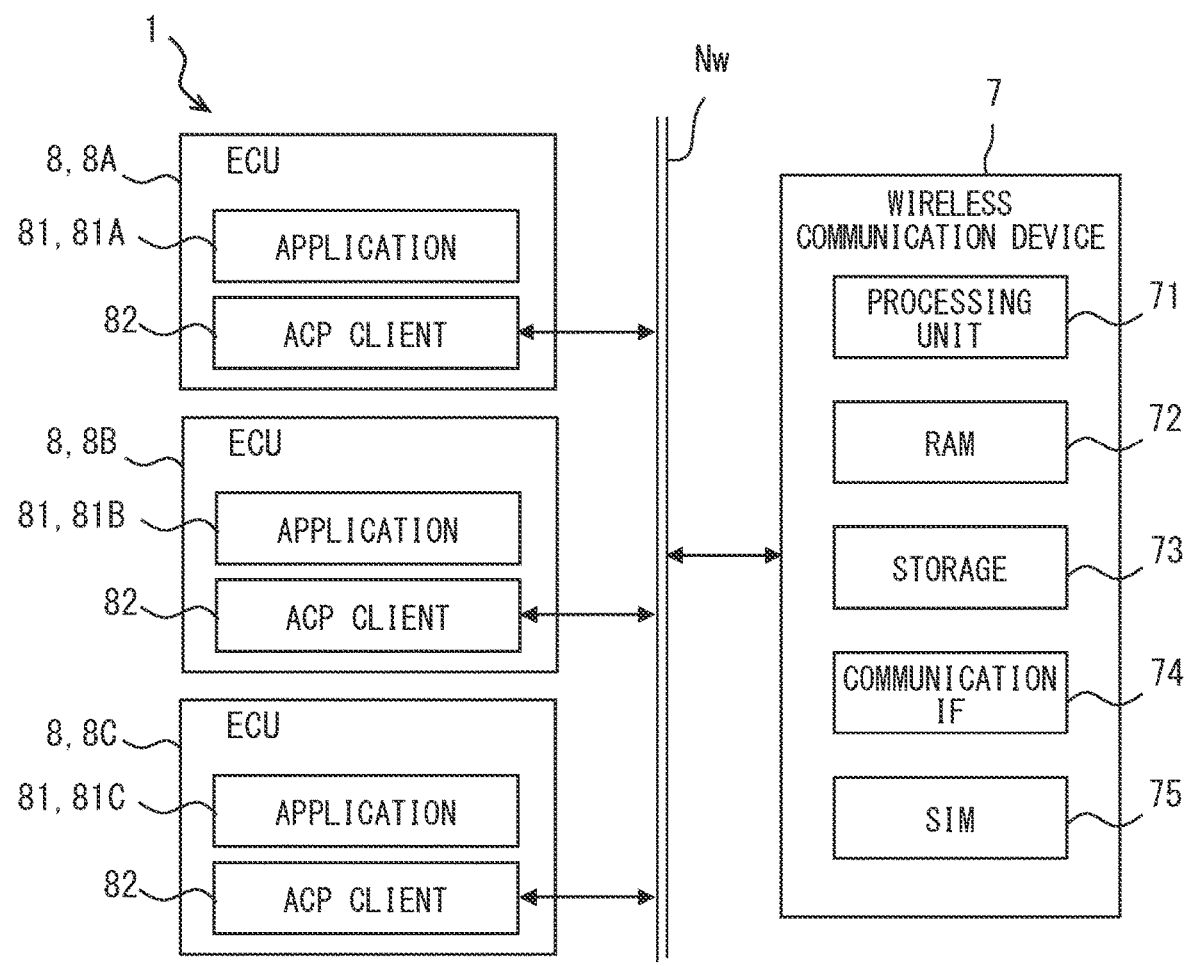
FIG. 3 is a block diagram illustrating a configuration of an in-vehicle communication system.

As illustrated in FIG. 3, the in-vehicle communication system 1 includes the wireless communication device 7 and multiple ECUs 8. The wireless communication device 7 is a device that provides the wireless communication function described above, and corresponds to a UE for the core network 3. The wireless communication device 7 includes at least one subscriber identity module (hereinafter, SIM) 75. Accordingly, the wireless communication device 7 is capable of performing data communication using at least one APN corresponding to the SIM 75. The APN corresponding to the SIM 75 indicates an available APN based on information on the SIM 75.

As an example, the wireless communication device 7 according to the present embodiment is capable of using multiple cellular lines having different APNs. When the APNs are different, even if the server 4 serving as a communication partner is the same, a path through which data flows to the server 4 is substantially or virtually different. The multiple cellular lines implement different communication paths. That is, the wireless communication device 7 is capable of performing data communication with the server 4 using the multiple communication paths.

In addition, the wireless communication device 7 is capable of performing Wi-Fi communication, and selectively using the multiple cellular lines and Wi-Fi lines depending on an occurrence status of communication traffic in each ECU 8. That is, the wireless communication device 7 selectively uses various communication lines based on communication purposes and communication status. A concept of the communication line or the communication path available for the wireless communication device 7 includes not only the cellular line corresponding to each APN but also the Wi-Fi line.

Each ECU 8 is connected to the wireless communication device 7 via an in-vehicle network Nw, which is a communication network built in the vehicle. Devices connected to the in-vehicle network Nw can perform communication with one another. That is, the wireless communication device 7 is capable of performing communication with each ECU 8. Specific devices included in the in-vehicle communication system 1 may be capable of performing direct communication with one another without passing through the in-vehicle network Nw. In FIG. 3, the in-vehicle network Nw is formed as a bus type, but the present disclosure is not limited thereto. A network topology may be a mesh type, a star type, a ring type, or the like. As a standard of the in-vehicle network Nw, for example, various standards such as Controller Area Network (CAN is a registered trademark), Ethernet (registered trademark), and FlexRay (registered trademark) can be adopted.

Each ECU 8 is implemented as a computer including a calculation core such as a CPU and a memory such as a RAM, and executes a program assigned to each ECU 8 to perform a process according to the program. Hereinafter, when the multiple ECUs 8 are described separately, the ECUs 8 are also described as an ECU 8A, an ECU 8B, and an ECU 8C. The number of the ECUs 8 included in the vehicle Hv is not limited to three. The number of ECUs 8 may be one or two, or may be four or more.

The multiple ECUs 8 include the applications 81 that provide different functions. That is, the ECUs 8A to 8C include applications 81A to 81C, respectively. Each ECU 8 includes an ACP client 82.

Each application 81 is implemented by hardware such as a CPU executing predetermined application software. The "application (application 81)" according to the present disclosure can be read as a device/calculation core that executes the application. The calculation core corresponds to a processor such as a CPU.

The applications 81A to 81C are the corresponding applications 81 in order of the servers 4A to 4C. For example, the application 81A included in the ECU 8A is an application that performs driver-assistance in cooperation with the server 4A. More specifically, for example, when a predetermined event occurs, the application 81A receives, from the server 4A, real-time information (that is, control support information) serving as a reference for creating a control plan. The event that requests the control support information can be, for example, that a remaining time/distance to an intersection or a confluent branch point is less than a predetermined value. The application 81A may be configured to inquire the server 4A of the control support information corresponding to the current position at predetermined time intervals. Such an application 81A corresponds to an example of an ADAS system application.

The application 81B is, for example, an application that performs path guidance to a destination set by an occupant in cooperation with a human machine interface (HMI) system including a display. The application 81B downloads a map in a range corresponding to the current position and a planned travel path from the server 4B, for example, and performs a path guidance process using the map data. Such an application 81B corresponds to a map-based application that performs path guidance or the like based on the map data. The application 81C is an application that provides an audio function, that is, a music application. The application 81C acquires, from the server 4C, for example, music data designated by the user or music data selected by the application 81C or the server 4C, and streaming reproduces the music data.

Needless to say, contents and services of the application 81 included in each ECU 8 described above are merely examples, and can be appropriately changed. In addition to the above-described functions, the various applications 81 such as a video application, a call application, an emergency notification application, a remote control application, a voice recognition application, a probe application, and a software update application may be installed in the vehicle Hv. The video application is the application 81 that streaming reproduces a video stored on the cloud, and the call application is the application 81 that provides a telephone function. The emergency notification application is the application 81 that communicates with a predetermined center with an accident, an abnormality of the occupant, or the like as a trigger, and the remote control application is the application 81 that remotely controls the vehicle Hv. The voice recognition application is the application 81 that recognizes a voice content of the user acquired by an in-vehicle microphone, and the probe application is the application 81 that uploads, to the server, probe data such as a road shape recognized by an on-board camera or the like. The software update application is the application 81 that updates software of any ECU 8 based on data acquired from the server 4.

Here, as an example, it is assumed that one ECU 8 corresponds to one application 81, but the present disclosure is not limited thereto. One ECU 8 may include the multiple applications 81. Further, the multiple ECUs 8 may be configured to execute one application 81 in cooperation with one another.

The application ID, which is identification information unique to each application 81, is assigned to each application 81. The application ID may be assigned by a designer of the application 81, or may be assigned by a predetermined ECU 8 that integrally manages installation of software to the vehicle Hv or the like at the time of installation to the vehicle Hv (actually, ECU 8).

Each application 81 outputs, to the wireless communication device 7, transmission data addressed to the server 4 corresponding to the application 81, and acquires data from the corresponding server 4 from the wireless communication device 7. Each application 81 outputs a communication start request to the ACP client 82 in accordance with generation of the transmission data to the server 4 or the like. The communication start request corresponds to, for example, a predetermined electric signal, a message, or a communication frame. The communication start request includes the application ID. The communication start request may include a communication condition indicating a condition related to data communication between the application 81 and the server 4.

The ACP client 82 is configured to play a role of mediating communication between the application 81 and the wireless communication device 7. The ACP client 82 can also be referred to as an in-vehicle relay module. The ACP client 82 may be disposed for each application 81 or each ECU 8. The ACP client 82 is also implemented by hardware such as a CPU executing ACP client software, which is predetermined software. The ACP client 82 transmits the communication start request from the application 81 to the wireless communication device 7, and transmits, to the application 81, a response from the wireless communication device 7 to the communication start request.

The ACP client 82 may be any element and may be omitted. The function of the ACP client 82 may be included in the application 81 itself. The ACP client 82 may be configured as a part of the application 81. In addition, the ACP client 82 may be configured as a part of the wireless communication device 7. A functional arrangement of each configuration can be appropriately changed. The ACP client 82 has a function of managing a communication request and a communication condition of the corresponding application 81. Details of the communication condition will be separately described later.

(Configuration of Wireless Communication Device 7)

The wireless communication device 7 transmits data to the servers 4A to 4C in response to requests from the multiple applications 81 installed in the vehicle Hv, and receives data transmitted from the servers 4A to 4C. Such a wireless communication device 7 corresponds to a wireless interface through which each ECU 8 performs wireless communication with the server 4 serving as a predetermined communication partner. The vehicle Hv is a connected car that can be connected to the Internet by installing the wireless communication device 7. The wireless communication device 7 can also be referred to as a data communication module (DCM), a telematics control unit (TCU), or the like. The wireless communication device 7 is accommodated in, for example, an instrument panel. The wireless communication device 7 may be removable by the user. The wireless communication device 7 may be a mobile terminal such as a smartphone carried into a vehicle cabin by the user.

The wireless communication device 7 mainly includes a computer including a processing unit 71, a RAM 72, a storage 73, a communication interface 74, the SIM 75, a bus that connects these units, and the like. The processing unit 71 is hardware for a calculation process combined with the RAM 72. The processing unit 71 includes at least one calculation core such as a CPU. The processing unit 71 performs various processes by accessing the RAM 72.

The storage 73 includes a non-volatile storage medium such as a flash memory. The storage 73 stores a communication control program as a program executed by the processing unit 71. The execution of the program by the processing unit 71 corresponds to performing a communication control method which is a method corresponding to the communication control program. Information (for example, profile or the like) on the APN available for the wireless communication device 7 is registered in the storage 73. For example, the information on the APN may include information specifying a connection destination to a network such as the Internet.

The communication interface 74 is a circuit module for communicating with the ECU 8 via the in-vehicle network Nw. The communication interface 74 is implemented using an analog circuit element, an IC, a PHY chip in accordance with a communication standard of the in-vehicle network Nw, or the like. In addition to the transmission data input from the ECU 8, for example, various data such as vehicle speed data detected by a vehicle speed sensor are input to the communication interface 74. Here, the transmission data corresponds to communication traffic (in other words, data) for the server 4.

The SIM 75 is an IC module in which information for identifying a contractor of a line is recorded, and is implemented as, for example, an IC card. For example, a unique number called international mobile subscriber identity (IMSI) is recorded in the SIM 75 in association with a telephone number of the contractor. Setting data related to wireless communication connection, such as an available frequency and a priority order of a frequency to be observed to determine a serving cell, is also registered in the SIM 75. The SIM 75 may be inserted into a card slot (not illustrated) or may be an embedded SIM (eSIM). A concept of the SIM 75 here includes both a detachable card type and an embedded type (that is, the eSIM).

In the present embodiment, as an example, the SIM 75 included in the wireless communication device 7 is capable of using two APNs. In other words, the SIM 75 is a SIM that can be used by two cellular lines. Hereinafter, the two cellular lines that can be used by the wireless communication device 7 using the SIM 75 are called a first line and a second line. Of the first and second lines, a cellular line having a relatively low QoS is referred to as a low QoS cellular line, and a cellular line having a relatively high QoS is referred to as a high QoS cellular line.

The cellular line having a low QoS corresponds to, for example, a cellular line in which a communication speed is slow or a communication delay is likely to occur due to communication settings (in other words, policy conditions) such as low priority order for data transfer in the core network 3 or no bandwidth guarantee. The cellular line having a low QoS can be understood as a cellular line suitable for data communication that does not require much immediacy, such as upload of probe data. On the other hand, the cellular line having a high QoS is a cellular line in which the communication delay is unlikely to occur. The cellular line having a high QoS can be understood as a cellular line suitable for data communication that requires high immediacy such as remote control of the vehicle Hv.

As an example, it is assumed that the SIM 75 is capable of using multiple cellular lines having different communication characteristics such as quality and transmission capacity, but the present disclosure is not limited thereto. The SIM 75 may be only one available cellular line. However, in order to flexibly deal with various communication requirements from the ECU 8, the wireless communication device 7 may be capable of using the multiple cellular lines. The wireless communication device 7 may include multiple SIMs 75.

(Functions of Wireless Communication Device 7)

Here, functions and operations of the wireless communication device 7 will be described. As illustrated in FIG. 4, the wireless communication device 7 includes an in-vehicle communication unit F1, a wireless communication unit F2, and a communication control unit F3 as functional blocks. The wireless communication unit F2 includes a cellular communication unit F21 and a Wi-Fi communication unit F22. The communication control unit F3 corresponds to a communication control device.

The in-vehicle communication unit F1 is configured to receive the transmission data output by each ECU 8, output the transmission data to the wireless communication unit F2, and output the data received by the wireless communication unit F2 to the ECU 8 to be transferred. For example, the in-vehicle communication unit F1 acquires original data by separating, by a predetermined method, data multiplexed and input from each ECU 8. The in-vehicle communication unit F1 includes a buffer, which is a storage area for temporarily holding data input from each ECU 8 until the data is wirelessly transmitted to the cellular base station 2 or the Wi-Fi base station 6. The buffer may be implemented using a rewritable storage medium such as a RAM. The in-vehicle communication unit F1 also has a function of monitoring an amount of data retained in the buffer and information stored in a header of the data.

The data stored in the buffer is sequentially taken out by the wireless communication unit F2, and is transmitted to the server 4 serving as a destination via a communication path corresponding to an input source (that is, ECU 8) of the data. An assignment state of the communication path for each ECU 8 is controlled by the communication control unit F3. Setting the communication path includes selecting which of multiple types of communication lines to use, such as multiple cellular lines and Wi-Fi. A method for assigning a communication path for each ECU 8, in other words, for each application 81 will be separately described later.

The cellular communication unit F21 is, for example, a communication module in charge of a data link layer and a physical layer in a wireless communication protocol such as LTE. The cellular communication unit F21 includes an antenna capable of transmitting and receiving radio waves in a frequency band used in the LTE. The cellular communication unit F21 includes a transceiver that performs signal processing corresponding to conversion from a baseband signal to a high-frequency signal and inverse conversion thereof in accordance with an LTE communication standard, and a packet processing unit that performs conversion between an IP packet and a physical channel signal. Multiple antennas may be provided for reception diversity and the like.

The cellular communication unit F21 performs a process in each data link sublayer of PDCP, RLC, and MAC on the IP packet input from the in-vehicle communication unit F1. By performing a process such as encoding, modulation, digital-to-analog conversion, or the like, a carrier signal corresponding to the input data is generated. Then, the generated carrier signal is output to an antenna to radiate the carrier signal as radio waves. PDCP is an abbreviation of packet data convergence protocol, RLC is an abbreviation of radio link control, and MAC is an abbreviation of media access control. In addition, the cellular communication unit F21 performs a predetermined process such as an analog-to-digital conversion process and a demodulation process on the received signal received by the antenna, thereby converting the received signal into an information sequence (that is, digital data) expressed by digital values. Then, the data corresponding to the received signal is output to the in-vehicle communication unit F1.

The Wi-Fi communication unit F22 is a communication module for connecting to the Internet via the Wi-Fi base station 6 and communicating with the server 4. The Wi-Fi communication unit F22 is implemented using, for example, an antenna that transmits and receives radio waves in a frequency band used in a Wi-Fi standard, such as a 2.4 GHz band or a 5 GHz band, a modulation circuit, and a demodulation circuit. The Wi-Fi communication unit F22 radiates a radio signal corresponding to data input from the in-vehicle communication unit F1 or the communication control unit F3. The Wi-Fi communication unit F22 outputs data corresponding to the received signal received by the antenna to the in-vehicle communication unit F1 or the communication control unit F3.

The Wi-Fi communication unit F22 recognizes the presence of the Wi-Fi base station 6 by receiving a beacon transmitted from the Wi-Fi base station 6. Communication connection between the Wi-Fi communication unit F22 and the Wi-Fi base station 6 is controlled by the communication control unit F3.

The communication control unit F3 monitors and controls a communication state of each cellular line. In response to an occurrence of a predetermined connection event, the communication control unit F3 performs a procedure for establishing a communication line for each APN. The procedure for establishing the communication line includes transmission of an attach request, transmission of APN information, and the like. For example, a network-side device such as an MME 31 cooperates with the S-GW and the P-GW based on information such as an APN notified by the wireless communication device 7, and prepares a radio bearer and a PDN connection in accordance with contract contents.

The connection event may be, for example, a case where a vehicle power supply is turned on or a case where a wireless communication function is enabled based on a predetermined user operation on an operation member included in the vehicle Hv. Here, the vehicle power supply may be an accessory power supply or a traveling power supply. The traveling power supply is a power supply for the vehicle Hv to travel, and indicates an ignition power supply when the vehicle Hv is a gasoline vehicle. When the vehicle Hv is an electric vehicle or a hybrid vehicle, the traveling power supply indicates a system main relay.

The communication control unit F3 controls an operation of the Wi-Fi communication unit F22. The communication control unit F3 starts the communication connection between the Wi-Fi communication unit F22 and the Wi-Fi base station 6 based on reception of a beacon by the Wi-Fi communication unit F22. That is, the Wi-Fi communication unit F22 exchanges control signals with the Wi-Fi base station 6 for IP address acquisition and security settings (exchange of an encryption key or the like).

Further, the communication control unit F3 includes, as function units, a movement management unit F31, a path characteristic acquisition unit F32, a communication condition acquisition unit F33, a path setting unit F34, and a communication amount management unit F35. The communication control unit F3 includes, for example, a path characteristic holding unit M1 implemented using a rewritable storage medium such as the RAM 72.

The movement management unit F31 is configured to specify a serving cell for each cellular line designated by the SIM 75 and perform movement management of the cell. The movement management unit F31 calculates an RSRP, an RSSI, an RSRQ, and the like for each cell as an index for selecting the serving cell. The RSRP is an abbreviation of reference signal received power. The RSSI is an abbreviation of received signal strength indicator. The RSRQ is an abbreviation of reference signal received quality. The RSRP is an average received electric power of the RS per unit resource element. The RSSI is a value obtained by measuring an overall electric power of an LTE system bandwidth in an OFDM symbol that stores the RS. The RSRQ is a ratio of a received electric power of a cell-specific reference signal to a total electric power within a received bandwidth. The greater the RSRQ, the better a reception quality of a signal from the cellular base station 2.

The movement management unit F31 performs a process for switching the serving cell as necessary based on an index such as the RSRP for each cell corresponding to the SIM 75. The cell corresponding to a certain SIM 75 refers to a cellular base station connectable based on information on the SIM 75 and a cell thereof. Information such as the RSRP and the RSRQ for each cell corresponding to each SIM 75 calculated by the movement management unit F31 is temporarily held in the path characteristic holding unit M1. The information held by the path characteristic holding unit M1 is updated as needed.

The path characteristic acquisition unit F32 is configured to acquire various kinds of information indicating communication characteristics for each communication line. For example, the path characteristic acquisition unit F32 acquires, from the network-side device, communication setting parameters for each cellular line. Examples of the communication setting parameters for each cellular line include an assignment frequency, a priority order for packet transfer, a target delay time, and a packet loss rate. The target delay time is a maximum value of a communication delay time assumed by the network-side device. The target delay time corresponds to a delay threshold set by the network-side device such as a PCRF. The communication setting parameters acquired by the path characteristic acquisition unit F32 are stored, for example, in the path characteristic holding unit M1.

The path characteristic acquisition unit F32 may acquire information on a communication carrier (so-called carrier) for each cellular line and store the information in the path characteristic holding unit M1. If the communication speed and communication stability are different from each other due to a communication facility or the like owned by each communication carrier, information of the communication carrier may be a material for evaluating reliability, in other words, QoS for each cellular line. For example, a communication line provided by a mobile virtual network operator (MVNO) that uses a communication facility provided by another communication carrier tends to have a lower downlink communication speed than a communication line provided by the communication carrier that owns the communication facility. In this way, the information of the communication carrier may be an index of superiority or inferiority of the communication speed for each cellular line.

In addition, the path characteristic acquisition unit F32 may sequentially evaluate a round-trip time (RTT) and throughput for each cellular line as state information for each cellular line, and store the state information for each cellular line in the path characteristic holding unit M1. The RTT is a time taken from when a signal or data is transmitted to a communication partner to when a response is returned, that is, a response delay time. The RTT is also referred to as round-trip latency. The throughput represents an amount of data that can be transmitted and received per unit time through a transmission line. The throughput corresponds to an index indicating the communication speed. The throughput may be separately evaluated by uplink communication and downlink communication. Regarding the RTT, latency, and the like, a state of each cellular line may be evaluated using an average value of observation values within a latest predetermined time. When a downlink communication speed of the first line tends to be higher than that of the second line, the first line can be understood as a communication line suitable for the application 81 that frequently acquires data from the server 4 rather than being uploaded to the server 4. A line with a very small RTT can be understood as a line suitable for the application 81 that is important in real time, such as the call application, a web conference application, and the remote control application.

The path characteristic acquisition unit F32 evaluates the QoS for each cellular line based on, for example, parameters such as the assignment frequency and the RTT. Therefore, in one aspect, the path characteristic acquisition unit F32 can be understood as a service quality evaluation unit that evaluates QoS for each wireless communication service. The path characteristic acquisition unit F32 may be integrated with the movement management unit F31. The path characteristic acquisition unit F32 corresponds to a line characteristic acquisition unit.

The communication condition acquisition unit F33 acquires the communication condition from each application 81. As items constituting the communication condition, for example, as illustrated in FIG. 5, an allowable waiting time, an allowable RTT, a minimum bandwidth, an assumed data size, a data holdable time, a charging target, a data loss possibility, privacy, urgency, confidentiality, and control availability can be adopted.

The allowable waiting time indicates until when it is necessary to start communication, in other words, an allowable waiting time until the communication starts. For example, an allowable waiting time for the voice recognition application may be set to 1 second, 3 seconds, or the like. In the case of the probe application, an allowable waiting time may be set to 10 minutes or the like. An allowable waiting time for the software update application may be set to eight hours, one day, or the like. An allowable waiting time for an application having a high urgency, such as the emergency notification application, may be set to, for example, 0 seconds or 100 milliseconds. Here, "d", "h", "min", "s", and "ms" shown in a column of a setting value example in FIG. 5 indicate units of time such as "day", "hour", "minute", "second", and "millisecond".

The allowable RTT indicates an allowable response delay time. For example, in the case of the remote control application, the allowable RTT may be set to 1 millisecond or the like. In the case of the call application, the allowable RTT may be set to 100 milliseconds or the like. The allowable RTT corresponds to an allowable delay time. The minimum bandwidth indicates a minimum value of communication bandwidth to be secured. The minimum bandwidth can be expressed in terms of the communication speed such as 10 Mbps or 1 Mbps. The minimum bandwidth may be calculated and set by the communication condition acquisition unit F33 based on the assumed data size, the data holdable time, a generation frequency of the transmission data, and the like.

The assumed data size indicates an assumed value of a size of one data set exchanged between the application 81 and the server 4. The data holdable time indicates a remaining time during which the transmission data is holdable in a cache region included in each application 81. The data holdable time may vary sequentially. The charging target indicates who should bear a cost (so-called communication cost) associated with communication between the application 81 and the server 4. The charging target can be roughly classified into, for example, a vehicle manufacturer, a user, and others. A recipient of communication may be set as the charging target. For example, for the application 81 installed for the convenience of the vehicle manufacturer, such as the application 81 installed in advance in the vehicle Hv by the vehicle manufacturer, the vehicle manufacturer may be set as the charging target. For example, in a probe application for generating a map, the vehicle manufacturer or a predetermined map provider may be set as the charging target. Whether a charging destination of the communication performed by the application 81 is the vehicle manufacturer can be selected by the vehicle manufacturer.

The data loss possibility indicates whether the communication is communication in which the continuity of data is important, in other words, communication in which a data loss should be reduced. The data loss possibility can be expressed by, for example, a flag. For example, a case where a data loss flag is 1 (on) indicates a type of communication in which the data loss is to be prohibited or reduced, and a case where the data loss flag is 0 (off) indicates a type of communication in which the data loss or the like is allowed.

The application 81 in which the data loss is not allowed is, for example, an application related to a service for managing a premium based on a history of a driving operation such as a sudden braking or a sudden steering. The presence or absence of the sudden braking or the like is detected based on continuous data such as acceleration. If behavior data at the timing of the sudden braking is lost, it is difficult to detect an occurrence of the sudden braking, and the premium or the like cannot be properly determined. Data continuously indicating behaviors of the vehicle before and after an accident is important for determining a responsible proportion for the accident. Thus, in the application 81 that continuously reports temporal behaviors of the vehicle Hv or the user, the data loss flag can be set to on. In the remote control application, the data loss flag may also be set to on. In the music application or the like, the data loss flag may be set to off.

The privacy indicates whether the communication is communication including privacy information of the user. The privacy can be expressed by, for example, a flag. For example, a case where a privacy flag is 1 indicates a type of communication including privacy information, and a case where the privacy flag is 0 indicates a type of communication not including privacy information. The privacy information here can also be called personal information. The privacy information may include, for example, a face image, an address, a telephone number, and a name of the user.

The urgency indicates whether the communication is communication having a high urgency, in other words, communication to be started immediately. The urgency can be expressed by, for example, a flag. For example, a case where an urgency flag is 1 (on) indicates a type of communication having a high urgency, and a case where the urgency flag is 0 (off) indicates a type of communication having a low urgency. The application 81 in which the urgency flag is set to on is an emergency notification application, an application that uploads accident data to the server 4, a theft detection application, or the like. The theft detection application is an application that notifies the user or a predetermined administrator when a theft or unauthorized use of the vehicle Hv is detected. A degree of urgency may be determined by the communication condition acquisition unit F33 based on the above-described allowable waiting time. For example, when the allowable waiting time is set to be less than a predetermined emergency threshold, it may be determined that the data communication and the application 81 have high urgency. The emergency threshold may be set to, for example, 200 milliseconds.

The confidentiality indicates whether the communication is communication including confidential information. The confidentiality can be expressed by, for example, a flag. For example, a case where a confidentiality flag is 1 (on) indicates a type of communication including the confidential information, and a case where the confidentiality flag is 0 (off) indicates a type of communication not including the confidential information. The confidentiality flag can be used, for example, as a material for determining whether data should be transmitted and received in a distributed manner through multiple paths, or whether a dedicated line such as a virtual private network (VPN) should be used as a communication path in the communication control unit F3. The application 81 in which the confidentiality flag is set to on is, for example, the application 81 that browses or edits confidential documents in work stored in the cloud, and the application 81 that updates key information used in the vehicle Hv.

The control availability indicates whether data exchanged with the server 4 is data used for traveling control of the vehicle Hv. The control availability can be expressed by, for example, a flag. For example, a case where a control availability flag is 1 (on) indicates a type of communication that handles data used for vehicle control, and a case where the control availability flag is 0 (off) indicates a type of communication that handles data having no relation/weak relation with the vehicle control.

The communication condition does not need to include all of the above items. The above item group is an example, and a combination of specific items of the communication condition can be appropriately changed. In addition to the above, the communication condition may include, for example, a flag indicating whether it is desired to actively use Wi-Fi or whether to prohibit the use of a line in which billing for a communication cost to the user occurs. The communication condition may include reference information such as the generation frequency of the transmission data in the application 81.

The communication condition for each application 81 is input from the ACP client 82 to the wireless communication device 7 as a predetermined control signal, for example. For example, the communication condition may be notified by the ACP client 82 to the wireless communication device 7 at a timing when the ECU 8 is communicatively connected to the wireless communication device 7 as the vehicle power supply is turned on. The communication condition may be notified by the ACP client 82 to the wireless communication device 7 based on an occurrence of communication traffic (in other words, transmission data) for the server 4 in the application 81. The communication condition may be designated for each communication traffic. The communication condition may be acquired by the wireless communication device 7 inquiring the communication condition of each application 81 at a predetermined timing or periodically. In addition, the communication condition may be described in a header of data transmitted from each application 81 to the wireless communication device 7, or the like.

The path setting unit F34 is configured to set a communication path to be used for data communication of each application 81 based on the communication condition for each application 81 and characteristics for each cellular line. Details of the path setting unit F34 will be separately described later. Elements constituting the communication path can include, in addition to a type of communication line, a size (width) of assigned communication bandwidth, an assignment frequency, a type of communication protocol, and the like. The communication protocol includes a transmission control protocol (TCP), a user datagram protocol (UDP), and the like.

Similar to the communication amount management unit G3 included in the ACP server 5, the communication amount management unit F35 is configured to manage the communication amount for each application 81 using the source port number and the application ID for each application. In the present embodiment, as an example, it is assumed that a communication amount for each line for each application 81 is managed by both the wireless communication device 7 and the ACP server 5, but the present disclosure is not limited thereto. Any one of the wireless communication device 7 and the ACP server 5 may perform management for each application 81. For example, the wireless communication device 7 may not include the communication amount management unit F35.

(Flow of Process of Overall System)

Figure 6:
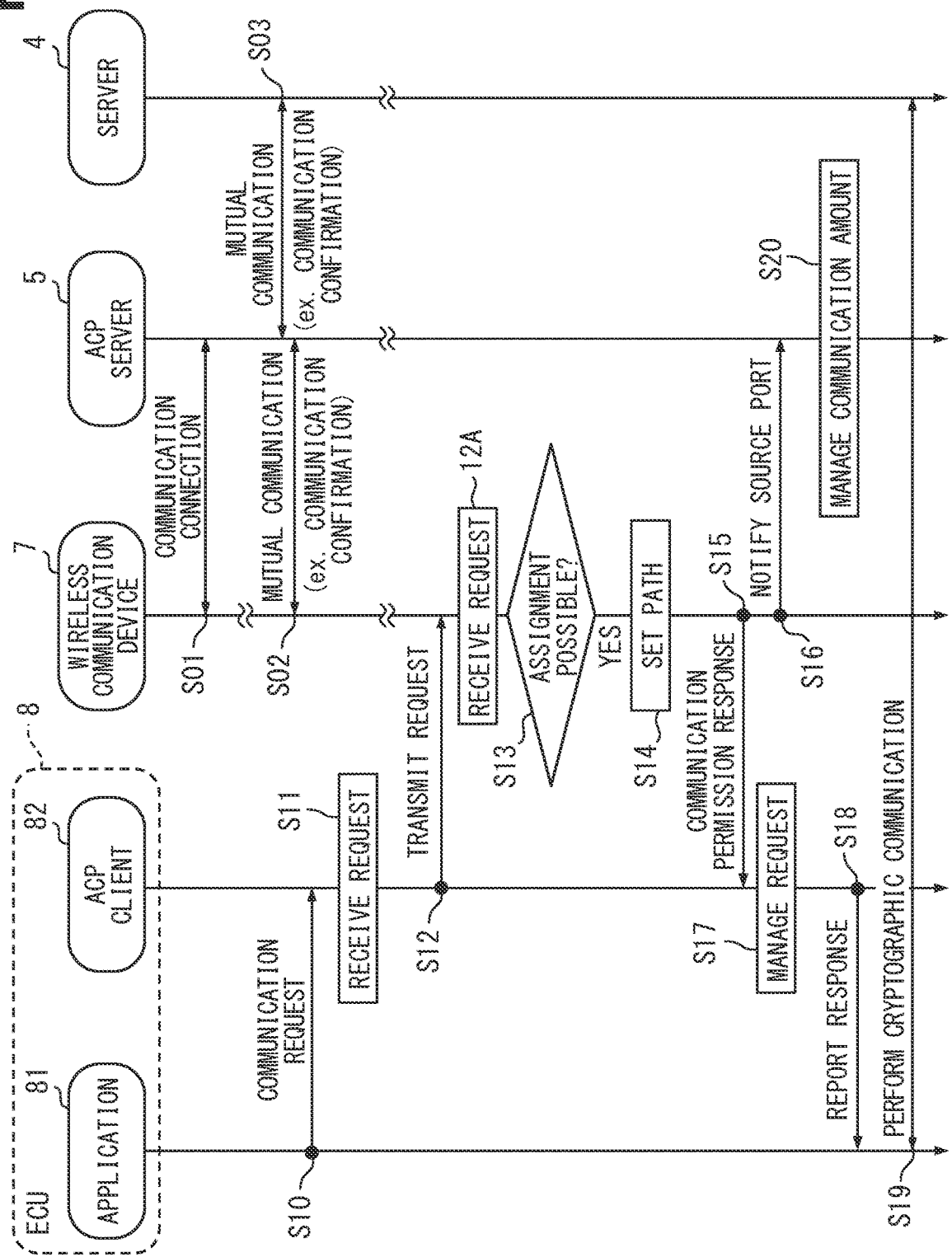
FIG. 6 is a sequence diagram in a case where a communication path that satisfies the communication condition can be assigned.
Figure 7:
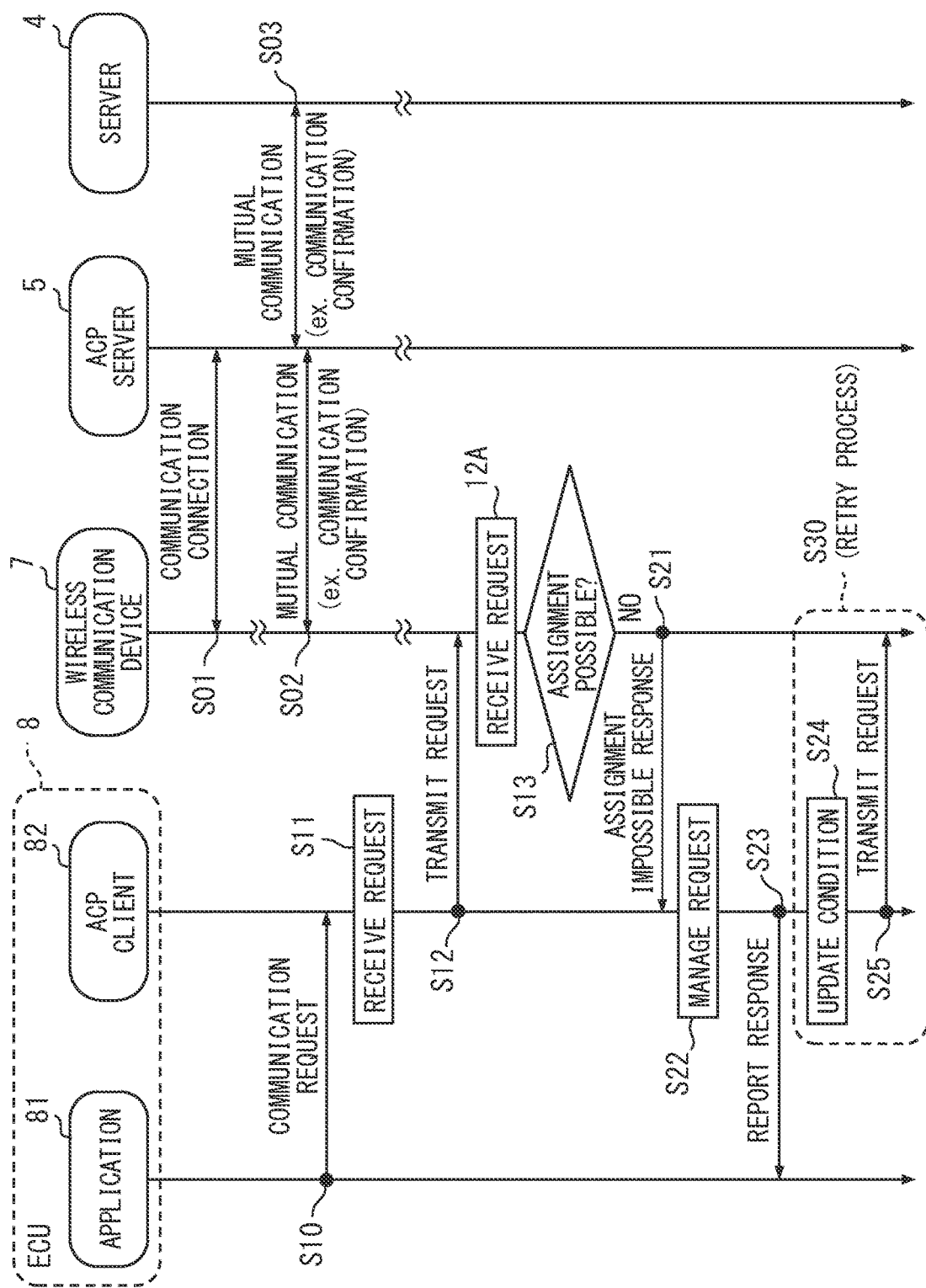
FIG. 7 is a sequence diagram in a case where the communication path that satisfies the communication condition cannot be assigned.

Next, interaction between the application 81, the ACP client 82, the wireless communication device 7, the ACP server 5, and the server 4 will be described with reference to sequence diagrams illustrated in FIGS. 6 and 7. The ECU 8 illustrated in FIG. 6 can be any ECU 8. The server 4 illustrated in FIG. 6 is the server 4 corresponding to the application 81 included in the ECU 8 illustrated in FIG. 6. The application 81 and the server 4 illustrated in FIG. 7 also correspond to each other, in other words, are configured to provide the same service. FIG. 6 is a sequence diagram when a communication path corresponding to a request from the application 81 can be assigned, and FIG. 7 is a sequence diagram when a communication path corresponding to a request from the application 81 cannot be assigned. The wireless communication device 7 as an execution entity of a process described below can be read as the communication control unit F3. Hereinafter, for the sake of convenience, the application 81 which is an output source of the communication start request is also referred to as a request source application.

First, the wireless communication device 7 establishes a communication line for each APN at a timing when a predetermined connection event occurs (step S01). In a state where the communication connection between the wireless communication device 7 and the ACP server 5 is established, the wireless communication device 7 and the ACP server 5 transmit and receive the predetermined control signal at an appropriate predetermined timing to perform communication confirmation (step S02). The ACP server 5 and the server 4 also transmit and receive the predetermined control signal at a predetermined time, for example, to perform the communication confirmation (step S03). That is, the wireless communication device 7 secures a communication path with the ACP server 5 prior to the communication start request from the application 81.

The communication control unit F3 of the wireless communication device 7 performs handover and the like associated with movement of the vehicle Hv in parallel with a process flow illustrated in FIG. 6. In parallel with the process flow illustrated in FIG. 6, the communication control unit F3 repeatedly performs communication connection and disconnection with the Wi-Fi base station 6 associated with the movement of the vehicle Hv.

Thereafter, when the transmission data is generated in the application 81, the application 81 outputs a communication start request to the ACP client 82 (step S10). The communication start request output from the application 81 to the ACP client 82 includes, for example, the application ID. The communication start request may include an initial communication condition. The initial communication condition is a communication condition at the time when the communication start request is generated. The initial communication condition may be fixed for each application 81 or may be variable according to an amount and content of the transmission data. When the initial communication condition is a fixed value, the initial communication condition can also be referred to as a default communication condition.

When the ACP client 82 receives the communication start request from the application 81, the ACP client 82 receives the request (step S11). Specifically, the application ID and the communication condition are associated with each other and temporarily stored in a predetermined storage area. Data indicating a reception state of the communication start request is stored in, for example, the RAM included in the ECU 8. The communication condition may be acquired by the ACP client 82 communicating with the application 81 in advance, or may be received as the communication start request as described above. When the default communication condition is registered in a non-volatile memory or the like included in the ECU 8, the ACP client 82 may acquire the communication condition by referring to the stored data. When the association between the application ID and the communication condition is completed, a communication start request including the application ID and the communication condition is transmitted to the wireless communication device 7 (step S12).

The wireless communication device 7 receives the communication start request from the application 81 based on the input of the communication start request from the ACP client 82 (step S12A). The wireless communication device 7 that performs step S12A corresponds to a request reception unit. Then, whether the communication path that satisfies the communication condition notified by the ACP client 82 can be assigned is determined based on a usage state, quality, and the like of each communication line (step S13). The wireless communication device 7 that performs step S13 corresponds to a communication possibility determination unit.

As described above, in the present embodiment, candidates of a communication line that accommodates the data communication of the application 81 include the first line and the second line. When the vehicle Hv is present within a communication range of the Wi-Fi base station 6 in which the vehicle Hv is available, the Wi-Fi line can also be included in options for a communication path that can be adopted. A path assignment process, which is a process for determining whether the communication line can be assigned, will be separately described later.

As a result of the determination process in step S13, when it is determined that a communication line satisfying the communication condition is present, step S14 is performed. In step S14, the path setting unit F34 secures a source port for the request source application, performs a routing process, and sets a communication path from the application 81 to the server 4. Accordingly, the source IP address, the source port number, the destination IP address, the destination port number, the protocol, and the like are determined. The source port is assigned to each application 81. That is, the source port number and the application ID are set to have a one-to-one relation. The number of applications 81 corresponding to one source port may be one. As another aspect, multiple source port numbers may be assigned to one application. For example, multiple source port numbers may be assigned to the application 81 that needs to transmit and receive data having high confidentiality in a distributed manner through the multiple paths.

When the setting of the communication path to the server 4 is completed, the wireless communication device 7 returns a communication permission response, which is a message indicating that communication is permitted, as a response to the communication start request to the ACP client 82 (step S15). The wireless communication device 7 that performs step S15 and step S21 to be described later corresponds to a response unit.

The communication permission response includes, for example, a source port number. As the response to the request, the wireless communication device 7 may transmit a token indicating the presence or absence of an execution right of communication, in addition to the source port number. The token corresponds to a control signal indicating whether communication is allowed now. While the token is input from the wireless communication device 7, the application 81 can perform communication with the server 4 using the notified source port.

The presence or absence of the token may be dynamically switched while maintaining the source port. The application 81 may have a configuration of determining that, once the token is input, a communication right until a signal for removing the token is input is held. The communication control unit F3 may dynamically control the presence or absence of the token of each application 81 in view of the usage state of the line and a communication demand of another application 81.

The wireless communication device 7 notifies the ACP server 5 of the application ID of the request source application in association with the source port number (step S16). The wireless communication device 7 may notify the ACP server 5 of communication path information other than the source port number. The communication path information other than the source port number is, for example, a transmission source, a destination IP address, a destination port number, or the like. Line information used for wireless communication is also included in the communication path information, such as which one of the first line, the second line, or the Wi-Fi line is used.

When the ACP client 82 receives the response from the wireless communication device 7, the ACP client 82 stores the application ID, the source port number, and the presence or absence of the token in association with one another as a request management process (step S17). When the communication path information other than the source port number is notified by the wireless communication device 7 as the response to the request, the ACP client 82 stores other communication path information in association with the source port number. Then, the ACP client 82 notifies the application 81 of the source port number and the presence or absence of the token as a response report from the wireless communication device 7 to the communication start request (step S18). When the communication path information such as the IP address is also notified by the wireless communication device 7, the ACP client 82 may notify the application 81 of the information.

When receiving the response report from the ACP client 82 in step S17, the application 81 starts cryptographic communication with the server 4 using the source port number indicated in the response report (step S19). For example, the application 81 and the server 4 perform transport layer security (TLS) encryption communication. Various patterns can be adopted as an execution pattern of the cryptographic communication. For example, the application 81 encrypts a data body (so-called payload), outputs the encrypted data to the wireless communication device 7 together with the source port number, adds a header corresponding to the source port number on a wireless communication device 7 side, packetizes the data, and wirelessly transmits the packet data. In another aspect, a header including 5 taple may be added to the data body encrypted by the application 81 and output to the wireless communication device 7. In this case, the wireless communication device 7 may refer to the source port number of the header of a data set input from the application 81 and wirelessly output the data through a communication path corresponding to the source port number.

As described above, communication between the application 81 and the server 4 is performed via the ACP server 5. The ACP server 5 manages the communication amount for each application 81 using the source port number notified by the wireless communication device 7 (step S20). That is, the amount of data exchanged using the source port is measured. The amount of data is managed separately for each line used for communication, as will be separately described later.

The above is a pattern when a communication line satisfying the communication conditions notified by the application 81 is present. When no communication line satisfying the communication condition in step S13 is present, an assignment impossible response, which is a message indicating that assignment is not possible, is returned to the ACP client 82 (see step S21 in FIG. 7). Determining that assignment is impossible corresponds to determining that communication in accordance with the notified communication condition is impossible. Here, "assignment impossible" can be rephrased as "communication impossible".

The assignment impossible response may be a message simply indicating that no communication line satisfying the requested communication condition is present. The assignment impossible response may include a predicted value of a waiting time until the communication that satisfies the communication condition is possible. In other words, the wireless communication device 7 may instruct the waiting time as the assignment impossible response. The predicted value of the waiting time may be estimated based on a communication status of the other application 81 or the like. For example, each application 81 may be inquired about a remaining time required for communication, a remaining amount of traffic, and the like, and the predicted value of the waiting time may be calculated based on these response results. In addition, the assignment impossible response may include a communication condition that can be performed in the current status. For example, an RTT of a communication service that can be provided at the present time, a transmittable data size, or the like may be notified.

When the ACP client 82 receives the assignment impossible response from the wireless communication device 7, as the request management process, the ACP client 82 sets a flag indicating communication start waiting to on (step S22), and reports to the application 81 that the application 81 is in a communication start waiting state (step S23).

Further, while the application 81 is in the communication start waiting state, the ACP client 82 updates specifications such as the allowable waiting time and the data holdable time included in the communication condition as needed (step S24). Then, a communication start request including the updated communication condition is output to the wireless communication device 7 at a predetermined retry cycle (step S25). For the sake of convenience, a series of processes in steps S24 and S25 is also referred to as a retry process (step S30). Each time the retry process is performed, the allowable waiting time decreases, and the data holdable time also decreases. In step S25 and subsequent steps, the wireless communication device 7 determines whether it is possible to assign a communication line that satisfies the communication status, as in step S13.

The retry cycle may be a constant value such as, for example, 5 seconds or 10 seconds. The retry cycle may be set to a value equivalent to 10% or 20% of the allowable waiting time or the like indicated in the initial communication condition. According to a configuration in which the retry cycle is set to a value corresponding to the allowable waiting time included in the initial communication condition, the communication start request is retransmitted at a cycle corresponding to characteristics of the application 81. As a result, a possibility of waiting for the start of communication more than necessary can be reduced. The retry cycle may be set to a length corresponding to the predicted value of the waiting time notified by the wireless communication device 7.

(Path Assignment Process)

Figure 8:
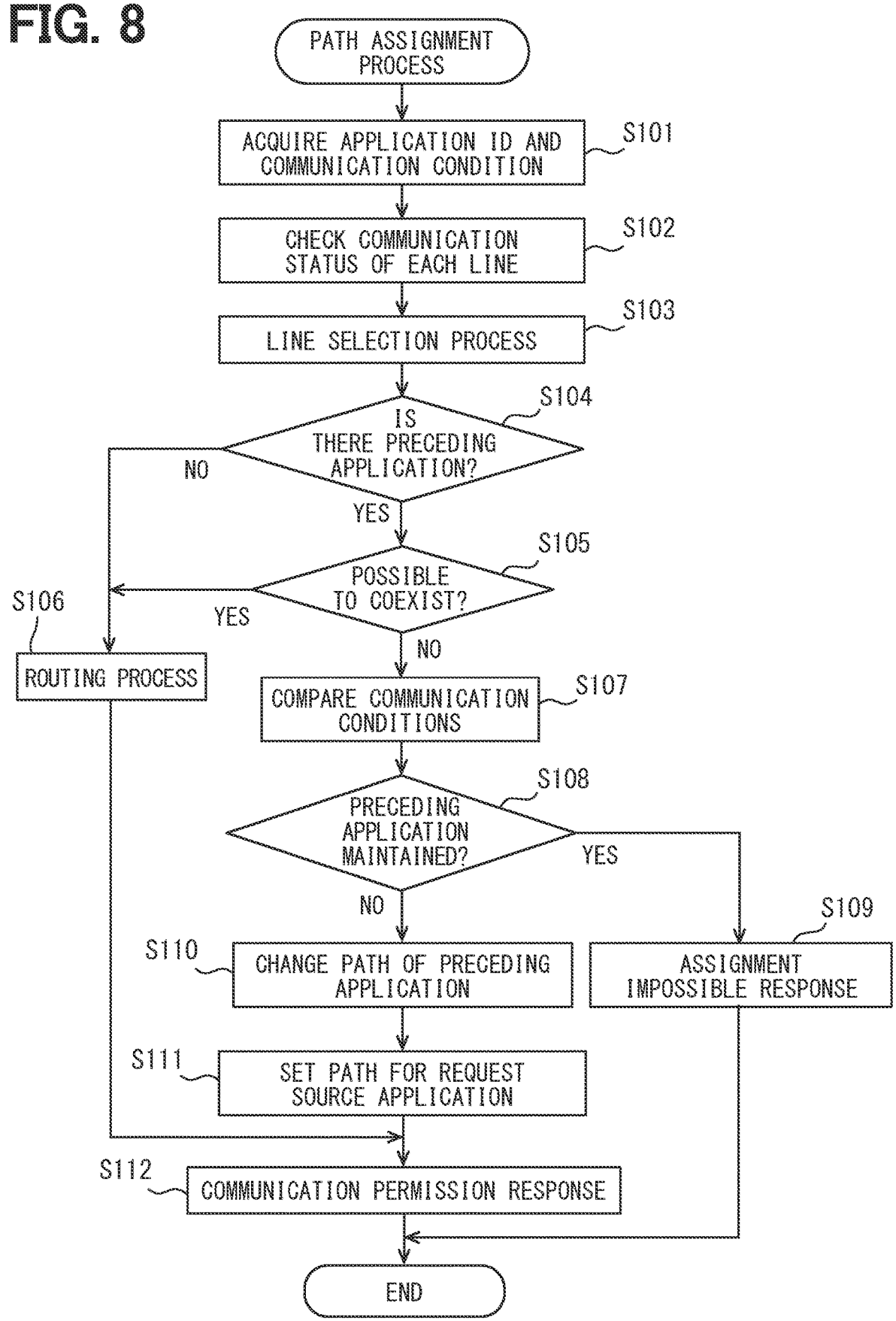
FIG. 8 is a flowchart of a path assignment process.

Here, the path assignment process performed by the communication control unit F3 will be described with reference to a flowchart illustrated in FIG. 8. The path assignment process corresponding to the flowchart illustrated in FIG. 8 is started, for example, based on the input of the communication start request from the ECU 8 (step S12 in FIG. 6). The path assignment process corresponds to a series of processes including steps S13 to S15 in FIG. 6 and steps S13 and S21 in FIG. 7. Here, as an example, the path assignment process includes steps S101 to S112. Needless to say, the number of steps included in the path assignment process, a processing order, and the like can be changed as appropriate.

First, in step S101, the application ID and the communication condition are acquired from the application 81 via the ACP client 82 as the communication start request, and the process proceeds to step S102. Step S101 can be referred to as a communication condition acquisition step.

In step S102, the communication control unit F3 checks a status of each communication line. Here, the status can include a size of the communication bandwidth assigned from the network-side device, a free capacity, an assignment frequency, a currently applied communication standard (4G, 5G, or the like), and the like. The status of each communication line can also include throughput, RTT, and the like for each communication line that are sequentially evaluated by the path characteristic acquisition unit F32. Needless to say, status information on the cellular line can include a priority order of packet transfer notified by the network-side device, a target delay time, a packet loss rate, and the like. The RSRP, the RSSI, the RSRQ, and the like for each serving cell can be incorporated as a status of the cellular line.

In addition, the status of each communication line can include attribute information such as a communication carrier that provides the communication line and whether the line is a dedicated line. Whether the Wi-Fi line is available is also included in a concept of the communication status. Step S102 can be referred to as a communication status checking step for checking a current status of each communication path. When step S102 is completed, the process proceeds to step S103.

In step S103, the path setting unit F34 selects an assignment line, which is a communication line to be assigned to the request source application, based on the status of each line acquired in step S101. The assignment line may be a communication line that satisfies the communication condition notified by the application 81 or a communication line that is expected to satisfy the communication condition. An option for the assignment line can be changed according to whether the Wi-Fi line is available at the time of performing step S102.

For example, when the allowable waiting time is set to be equal to or longer than a predetermined Wi-Fi waiting time as the communication condition, the Wi-Fi line may be set to the assignment line from a viewpoint of reducing a communication cost even when Wi-Fi communication is unavailable at the time of performing step S102. The Wi-Fi waiting time may be set to an expected length of entering a Wi-Fi spot until the set time elapses, such as one hour or two hours. According to such a configuration, the communication of the application 81 having a sufficiently long start waiting time is temporarily held and performed at the timing of entering the Wi-Fi spot. As a result, an effect of reducing the communication cost can be expected.

When Wi-Fi communication is unavailable at the time of performing step S102 and the allowable waiting time is set to be less than the Wi-Fi waiting time as the communication condition, the first line or the second line as the cellular line may be a candidate for the assignment line. For example, when the start waiting time is set to 10 seconds, 5 minutes, 20 minutes, or the like, the cellular line may be a candidate for the assignment line. Among the multiple cellular lines, a line that satisfies a communication condition, such as an allowable RTT, a minimum bandwidth, an assumed data size, a charging target, and a data loss possibility, may be selected as the assignment line.

In addition, the communication control unit F3 may select an assignment line based on a communication carrier, an APN, and an assignment frequency. In this case, the communication condition may include, as reference information, a communication carrier to be preferentially used, an APN, an assignment frequency, and the like. When it is assumed that the wireless communication device 7 is capable of using the multiple cellular lines, the communication condition may include information for determining a line to be used by the application 81 from the multiple cellular lines.

When the Wi-Fi communication is available at the time of performing step S102, the Wi-Fi line may also be a candidate for the assignment line. In this case, whether to select a Wi-Fi line as an assignment line depends on whether a communication speed, a security level, or the like of the Wi-Fi line satisfies the communication condition. If the communication condition is satisfied in the Wi-Fi line, the Wi-Fi line may be set as the assignment line.

When there are multiple assignable communication lines, a communication line having a larger throughput among the multiple assignable communication lines may be adopted as the assignment line. A communication line having a smaller RTT among the multiple assignable communication lines may be set as the assignment line. Which of the throughput and the RTT is preferentially used to select the line for the request source application may be determined depending on characteristics of the communication requested by the request source application, that is, the priority of a low delay and a large capacity. The low delay corresponds to the allowable RTT, and the large capacity corresponds to the assumed data size. In addition, when the wireless communication device 7 is capable of using the multiple cellular lines, which cellular line is preferentially used may be set in advance in the wireless communication device 7. In this case, it is also possible to perform assignment in order of arrival of communication start requests from a cellular line with the highest priority order. A priority order of each cellular line may be a constant value set in advance, or may be dynamically changed based on the QoS.

Here, as an example, in the determination in step S103, it is not determined whether the assignment line has a free capacity (that is, margin) that can actually accommodate the data communication of the request source application. That is, the assignment line can be selected based on the attribute information, information notified by the network-side device, and the like.

Figure 9:
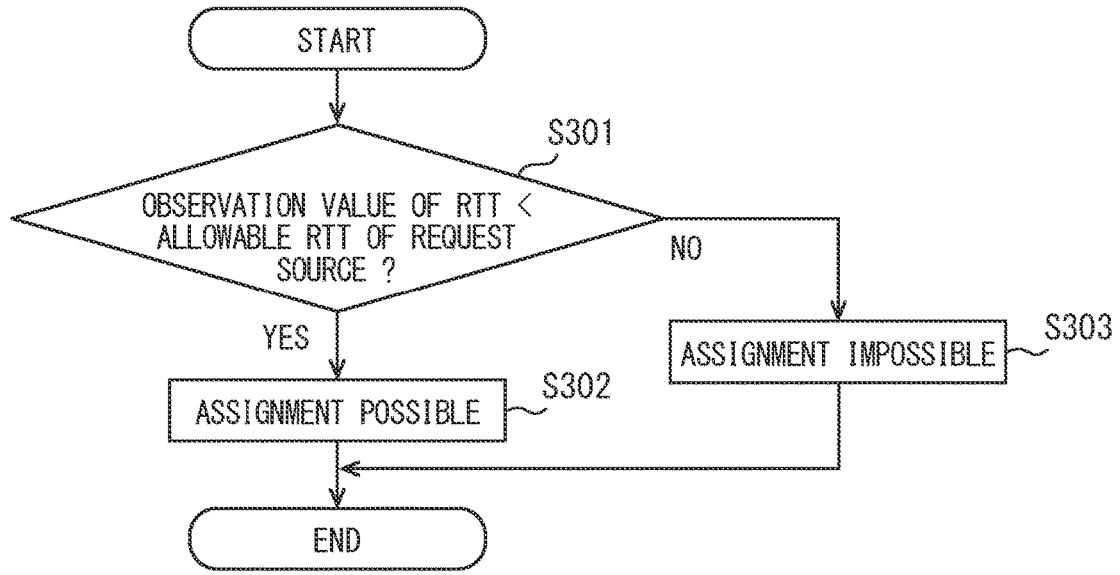
FIG. 9 is a flowchart of a process for selecting an assignment line using an allowable RTT.

Needless to say, as another aspect, the path setting unit F34 may be configured to select, as an assignment line, a line that satisfies the communication condition in view of the status such as an observation value of an RTT. The line that satisfies the communication condition can be referred to as a compatible line. For example, as illustrated in FIG. 9, when an observation value of an RTT in a certain communication line is smaller than the allowable RTT of the request source application (YES in S301), the communication line is adopted as a candidate for the assignment line (S303). On the other hand, when an observation value of an RTT in a communication line of interest is equal to or larger than the allowable RTT of the request source application (NO in S301), the communication line is excluded from the candidate for the assignment line (S303). If there is no communication line in which an actual RTT is less than the allowable RTT of the request source application, it may be determined that assignment is impossible. In this case, the process proceeds to step S109.

Similarly, the path setting unit F34 may be configured to select, as an assignment line, a line that satisfies the communication condition in view of a status such as an observation value of the throughput. When no communication line has a free capacity defined by the assumed data size is present, it may be determined that assignment is impossible. When step S103 is completed, the process proceeds to step S104.

In step S104, the path setting unit F34 determines whether there is a preceding application, which is another application 81 that is using the assignment line determined in step S103. The preceding application corresponds to the application 81 other than the request source application that is performing communication using the assignment line. When there is a preceding application, an affirmative determination is made in step S104, and the process proceeds to step S105. On the other hand, when there is no preceding application, a negative determination is made in step S104, and the process proceeds to step S106. Determining whether there is a preceding application corresponds to determining whether the assignment line is being used. The number of preceding applications is not necessarily limited to one. There may be multiple preceding applications.

In step S105, the path setting unit F34 determines whether both communication conditions of the preceding application and the request source application can be satisfied, in other words, whether communication between the preceding application and the request source application can coexist even when the communication of the request source application is accommodated in the assignment line. A state where the data communication of the multiple applications 81 can coexist corresponds to being able to perform each data communication simultaneously/in parallel while satisfying respective communication conditions.

For example, the path setting unit F34 determines whether requirements such as the allowable RTT of each application can be satisfied, based on observation values of a current throughput and RTT in the assignment line and the assumed data size of the request source application. For example, when the observation value of the current RTT is smaller than a minimum value of the allowable RTT for each application using the assignment line by a predetermined accommodation allowable threshold or more, it may be determined that the communication between the preceding application and the request source application can coexist. For example, the accommodation allowable threshold may be set to a larger value as the assumed data size of the request source application is larger. For example, the accommodation allowable threshold may be an influence time which is a value obtained by dividing the assumed data size by the current throughput. The accommodation allowable threshold may be a value obtained by adding a predetermined likelihood from the influence time. The influence time corresponds to an approximate value of an increment of the RTT that can occur when the traffic of the request source application is accommodated in the assignment line.

When it is determined that the communication between the preceding application and the request source application can coexist, an affirmative determination is made in step S105, and the process proceeds to step S106. On the other hand, when it is determined that the communication between the preceding application and the request source application cannot coexist, that is, when the communication condition in any of the applications is not satisfied, a negative determination is made in step S105, and the process proceeds to step S107.

In step S106, the path setting unit F34 exchanges control signals for path setting with the network-side device, the ACP server 5, the server 4, and the like using the assignment line selected in step S103, and secures a communication path from the wireless communication device 7 to the server 4. That is, securement of a source port number, acquisition of a destination port number, acquisition of a transmission source and a destination IP address, and the like are performed. When step S106 is completed, the process proceeds to step S112.

In step S107, a communication condition of the application 81 that is the communication request source is compared with a communication condition of the preceding application, and whether the communication of the preceding application should be maintained is determined (step S108). Maintaining the communication of the preceding application corresponds to rejecting the communication start request of the request source application. Not maintaining the communication of the preceding application corresponds to accepting the communication start request of the request source application and assigning part or all of communication resources assigned to the preceding application to the request source application. Here, each communication resource is, for example, communication bandwidth. The communication bandwidth can include, for example, a concept of a resource block.

Figure 10:
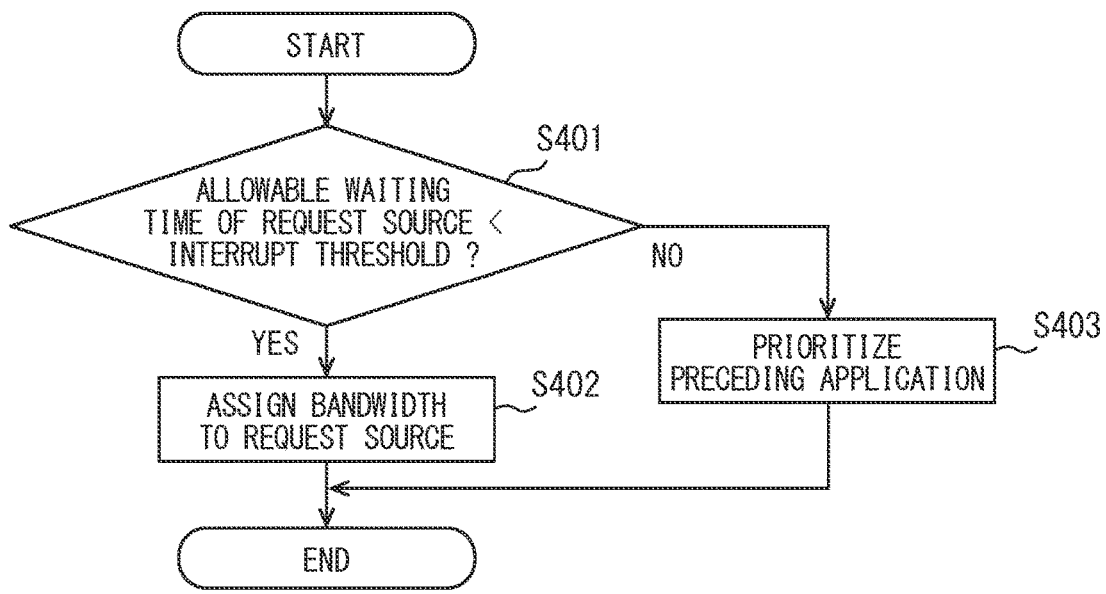
FIG. 10 is a flowchart of a process for determining whether to maintain communication of a preceding application using an allowable waiting time.

For example, as illustrated in FIG. 10, when an allowable start waiting time for the request source application is equal to or longer than a predetermined interrupt threshold (NO in S401), it is determined that the preceding application is maintained (S403). In this case, an affirmative determination is made in step S108 in FIG. 8, the process proceeds to step S109, and the assignment impossible response is returned to the request source application. The interrupt threshold is set to a value such as 1 minute or 30 seconds, assuming a state where it is necessary to start communication relatively quickly. Needless to say, the interrupt threshold may be 5 minutes, 10 minutes, or the like. On the other hand, when the allowable start waiting time for the request source application is less than the interrupt threshold (YES in S401), it is determined that the bandwidth is assigned to the request source application. In this case, a negative determination is made in step S108 in FIG. 8, and the process proceeds to step S110.

In addition to the allowable waiting time, the data holdable time can also be used as a parameter for determining whether to maintain the preceding application, in other words, which communication of the preceding application and the request source application is to be prioritized. For example, as illustrated in FIG. 11, when a data holdable time for the request source application is equal to or longer than a predetermined interrupt threshold (NO in S501), it may be determined that the preceding application is maintained (S503). When the data holdable time for the request source application is less than the interrupt threshold (YES in S501), it may be determined that the communication of the request source application is to be prioritized (S502). An interrupt threshold for the data holdable time is also set to a value such as 2 minutes or 4 minutes, assuming a state where it is necessary to start communication immediately. A reduction rate of the data holdable time may vary depending on a generation speed of the transmission data in the request source application. Therefore, the interrupt threshold for the data holdable time may be set to be longer than an interrupt threshold for the allowable waiting time. In addition, it may be determined which of the communication of the preceding application and the request source application is to be prioritized based on the urgency flag, the control availability flag, or the like indicated in the communication condition. When it is determined that the data communication according to the communication condition of the request source application is possible, the communication of the request source application may be started after the communication of the preceding application is saved.

In step S110, it is determined that the communication of the request source application is possible, and, for example, the communication of the preceding application is temporarily disconnected. When the communication of the preceding application is temporarily disconnected, communication bandwidth used by the preceding application is released. The process content in step S110 may be a process for changing a communication parameter of the preceding application to be able to accommodate the traffic of the request source application. Further, changing the communication parameter of the preceding application to be able to accommodate the traffic of the request source application corresponds to, for example, reducing the bandwidth assigned to the preceding application by an amount corresponding to the assumed data size of the request source application. When the communication of the preceding application can be accommodated in another line, the other line may be assigned to the preceding application. When the process in step S110 is completed, the process proceeds to step S111.

In step S111, as in step S106, the path setting unit F34 exchanges control signals for path setting with the network-side device, the server 4, and the like using the assignment line selected in step S103, and secures a communication path from the wireless communication device 7 to the server 4. When step S111 is completed, the process proceeds to step S112.

In step S112, a communication permission response is returned to the ACP client 82 corresponding to the request source application, and the flow ends. The communication permission response includes the source port number.

In the above, an aspect including a step of comparing the communication conditions of the preceding application and the request source application when there is a preceding application has been disclosed, but the present disclosure is not limited thereto. Even when there is a preceding application, in a state where the throughput, the free capacity, the RTT, and the like of the assignment line satisfy the communication condition of the request source application, the comparison of the communication conditions of the preceding application and the request source application may be omitted, and step S106 may be performed. That is, a process for comparing the communication conditions of the preceding application and the request source application can be any element.

(Specific Example of Operation)

Some specific examples of the path assignment process are illustrated here. It is assumed that a first application and a second application, which are different applications 81 described here, both use the same communication line, for example, the first line.

For example, in a state where the first application is performing communication, when a communication start request in which the allowable waiting time is set to 10 minutes is received from the second application, the communication of the first application is continued. An assignment impossible response is output to the ACP client 82 corresponding to the second application. The ACP client 82 corresponding to the second application reports that the second application is not permitted to communicate, updates the communication condition as needed, and periodically performs the retry process.

When the retry process is performed, the allowable waiting time included in the communication condition becomes shorter in accordance with an elapsed time from a time when the communication start request is first output. Therefore, at any time, the allowable waiting time defined in the communication condition is less than the interrupt threshold, and assignment of the communication line to the second application is performed. The data holdable time is also shortened according to the elapsed time from the time when the communication start request is first output and a generation speed of the traffic in the request source application. Therefore, as time elapses, the data holdable time defined in the communication condition may be less than the interrupt threshold, and the assignment of the communication line to the second application may be performed.

According to the above control aspect, even in a configuration in which the multiple applications 81 can perform communication simultaneously, it is possible to reduce the communication of the application 81 having a long allowable communication waiting time from influencing the communication of the application 81 already in communication.

As another example, when a communication start request from the second application is received in a state where the first application is performing communication, it is determined whether allowable RTTs of both applications 81 are compatible with each other. When the allowable RTTs of both the applications are expected to be compatible with each other, a source port of the second application is secured, and the routing process is performed. When the allowable RTT of the second application is smaller than that of the first application, bandwidth assigned to the first application corresponding to the preceding application may be reduced such that a communication quality of the second application is easily secured. That is, the communication of the application 81 having the smaller allowable RTT may be prioritized.

According to such a control aspect, it is possible to provide the communication connection of the request source application in consideration of the communication quality (mainly RTT) expected when simultaneous communication with the preceding application is performed.

As still another example, in a state where the first application is performing communication, when a communication start request is received from the second application in which the data holdable time is less than the predetermined interrupt threshold, the communication control unit F3 determines that it is necessary to start communication of the second application. A path setting to the second application is performed. For the first application as the preceding application, a communication parameter of the first application may be changed or the communication may be disconnected such that the communication of the second application is promptly performed.

According to the above control aspect, it is possible to provide a communication connection to the second application having a short data holdable time while considering simultaneous communication with the first application that is performing communication earlier. As a result, it is possible to reduce a possibility that buffer overflow occurs in the second application.

As another example, when the path setting unit F34 acquires a communication start request in which a data loss flag of the request source application is set to on, the path setting unit F34 changes a response based on whether the communication of the preceding application is a type of communication that allows data loss. As illustrated in FIG. 12, when the preceding application allows data loss (YES in S601), bandwidth is assigned to the request source application in preference to the preceding application (S602). On the other hand, when the preceding application also indicates that the data loss is not possible (NO in S601), for example, the communication of the preceding application is maintained (S603).

More specifically, when a communication start request from the second application in which the data loss flag is off is received during the communication of the first application in which the data loss flag is on, the communication control unit F3 transmits an assignment impossible response to the ACP client 82 of the second application. The ACP client 82 of the second application updates the specifications of the communication condition at the predetermined retry cycle and retransmits the communication start request.

According to such a control aspect, in a configuration in which the multiple applications 81 can perform communication simultaneously, it is possible to reduce a possibility that the communication quality of the application 81 in which data loss is impossible is impaired by the communication of another application 81. When a communication start request from the first application in which the data loss flag is on is received during the communication of the second application in which the data loss flag is off, the communication control unit F3 reduces or releases bandwidth for the second application, and secures a path for the first application. The communication permission response is returned to the ACP client 82 of the first application. When communication with the second application is disconnected, the fact is notified to the ACP client 82 of the second application.

When both the preceding application and the request source application do not allow data loss, it may be determined which communication is to be prioritized based on other communication parameters. For example, when both the preceding application and the request source application do not allow data loss, the communication having the shorter data holdable time is to be prioritized. When the multiple cellular lines can be used as in the present embodiment, the application 81 having a higher communication condition may be preferentially assigned to a line having higher reliability. The line having high reliability refers to a line having relatively high quality parameters such as the throughput and the RSRQ.

In addition, when an assumed data size received at the time of the communication start request of the preceding application is equal to or larger than a predetermined limit threshold, in the following, the application 81 that permits the use of the line may be limited to an application in which the assumed data size is less than a predetermined value. According to such a configuration, a communication speed added by the wireless communication device 7 can be maintained at the predetermined value or more.

A communication start request from an application whose urgent communication flag is set to urgent may immediately respond that assignment is possible, and that a line having the highest communication reliability is assigned at the time of securing the communication path.

(Supplement of Assignment Line for Each Source Port)

A communication line to be assigned to each application 81 may not be constant but may be dynamically changed. In other words, the communication line associated with the source port can be dynamically changed by the communication control unit F3. For example, when the active use of the Wi-Fi line is specified as a communication condition, the cellular line may be changed to the Wi-Fi line at the timing when the Wi-Fi line becomes available.

The communication control unit F3 may change an assignment state of a communication line for each application 81 by receiving a variation in communication quality such as a decrease in throughput or a deterioration in latency among cellular lines. In addition, in response to a communication start request from the application 81 having a high urgency or a communication status of each application 81, for example, communication of a certain application 81 is ended, assignment of a communication line to another application 81 may be changed.

In addition to a change in a status of each line and a change in a communication state for each application 81, a communication line state to the application 81 may be changed based on a predetermined behavior of the vehicle Hv or a user operation on the vehicle Hv. For example, a communication line for each application 81 may be reassigned in response to the fact that the vehicle Hv is temporarily stopped in waiting for a signal or the like. This is because the switching of the communication line may be accompanied by an instantaneous disconnection of communication, but when the vehicle Hv is stopped, it is possible to reduce a possibility that the instantaneous disconnection of communication influences the traveling control of the vehicle Hv.

(Management of Communication Amount/Communication Fee)

When a routing setting from the application 81 to the server 4 is completed, the application 81 starts cryptographic communication with the server 4 using the source port number notified by the wireless communication device 7. When the communication itself is encrypted, for example, information indicating a generation source of data input to the wireless communication device 7, such as the application ID, is also encrypted and becomes unknown. Therefore, in the wireless communication device 7, it is unclear which application 81 is performing communication and how long the communication is. Information that is not encrypted in the cryptographic communication is, for example, a source port number, a source IP address, a destination port number, a destination IP address. The payload including the application ID, in other words, application data is encrypted and becomes unknown.

Therefore, the communication control unit F3 and the ACP server 5 according to the present embodiment store the source port number and the application ID in association with each other, and manage a communication amount for each source port separately for each used line (S20 in FIG. 6). For example, as illustrated in FIG. 13, the ACP server 5 records the application ID, the source port number, and a communication amount for each line. In this way, according to a configuration in which an assignment line for each source port and a history of a communication amount thereof are held, since the source port and the application 81 correspond to each other, it is possible to specify the communication amount for each application 81. In particular, since the communication amount is recorded separately for each line, a total value of a communication fee in consideration of a fee system for each line can be calculated.

According to the configuration described above, the ACP server 5 can collect line-by-line usage amounts for each application 81 in each vehicle Hv. Therefore, for example, when there is the application 81 that is set such that the vehicle manufacturer bears the communication cost, the vehicle manufacturer can collectively pay a fee corresponding to a total communication amount of the application 81 in each vehicle Hv to the communication carrier. If the communication fee for each application 81 can be calculated, it is possible to perform a system response such as proposing to the user to refrain from using the application 81 whose communication fee/communication amount is reaching a predetermined upper limit value. Alternatively, with respect to the application 81 whose communication fee is reaching a predetermined upper limit value of the communication fee, it is possible to adopt a system response such as changing the communication condition to actively use Wi-Fi communication.

(Effects)

According to the above configuration, the wireless communication device 7 determines whether data communication between the request source application and the external device is possible based on a communication condition notified by the request source application and a communication status and a communication condition of the other application 81. According to such a configuration, even when the application 81 used in the vehicle Hv is dynamically changed or a combination of the applications 81 installed in each vehicle Hv is different, the assignment of the communication line according to the communication characteristics of each application 81 can be flexibly performed.

The wireless communication device 7 returns, to the request source application, a determination result as to whether the communication is possible immediately as a response. Therefore, the application 81 can grasp whether the communication can be started immediately. In particular, when it is determined that the communication is possible, since the source port number provided for the communication is notified, the request source application can perform the cryptographic communication using the source port.

Furthermore, in the system configuration described above, the wireless communication device 7 integrally controls data communication between the application 81 and the server 4 for each application 81, and assigns, to each application 81, a communication path according to a communication condition requested by the application 81. Accordingly, it is possible to reduce the possibility that the communication state of each application 81 deviates from an allowable range of each application 81, such as a delay time, as the entire system including the multiple applications 81. In other words, when it is necessary to perform multiple types of data communication in parallel that have different requests relating to the delay time of communication or the like, by using a line according to a type of each data communication in combination, it is possible to increase the communication efficiency as a whole.

The wireless communication device 7 adjusts a communication start timing with respect to each application 81. For example, when a usage rate of the communication line is high at the time when the communication start request arrives from the application 81 in which an allowable start time or a data holdable time is sufficiently large, the communication start is brought to a holding state by returning the assignment impossible response. According to such a configuration, by starting the data communication of the application 81 that does not need to start communication immediately, it is possible to reduce a possibility that the wireless resource is tight and the communication of the preceding application is hindered.

In addition, when the start of data communication is requested from the application 81 having a high urgency, the path assignment is preferentially performed for the application 81. Accordingly, it is possible to reduce a possibility that the communication of the application 81 having a high urgency is hindered due to the communication performed by the application 81 having a low urgency. An application having a high urgency is an emergency notification application, an ADAS system application, a remote control application, or the like.

While the embodiment of the present disclosure has been described above, the present disclosure is not limited to the embodiment described above, and various modifications to be described below are included in a technical scope of the present disclosure, and can be implemented by various changes within a scope not departing from the spirit described below. For example, the following various modifications can be implemented in combination as appropriate as long as technical contradiction does not occur. Members having the same functions as those described in the above embodiment are denoted by the same reference numerals, and descriptions of the same members will be omitted. When only a part of the configuration is referred to, the configuration of the embodiment described above can be applied to other parts.

(Supplement of Priority Control)

A determination material for determining which of the preceding application and the request source application should be prioritized is not limited to the above-described parameters, such as the start waiting time, the data holdable time, and the data loss possibility. For example, when the preceding application and the request source application have the same conditions such as a data holding time or the data loss possibility, the one whose urgency flag is on may be prioritized. When the preceding application and the request source application have the same conditions such as the data holding time or the data loss possibility, the one whose control availability flag is on may be prioritized. A VPN line may be assigned to the application 81 whose privacy flag or confidentiality flag is set to on, preferentially to the application 81 whose flag is set to off. Since contents/characteristics of the application 81 and data communication are basically in one-to-one correspondence, the application 81 here can also be read as data communication.

(Supplementary Description of Various Applications 81)

The remote control application described above is, for example, the application 81 that controls a behavior of the vehicle Hv by outputting control signals to various traveling actuators based on remote control data transmitted from a remote control center disposed outside the vehicle. The remote control application outputs an image such as an on-board camera image or sensor data indicating a traveling state of a vehicle speed sensor and the like to the wireless communication device 7 in order to transmit the image or the sensor data to the remote control center.

The probe application described above is, for example, the application 81 that sequentially transmits, as probe data, a data set indicating an observation position of a feature specified by a surrounding monitoring sensor to the server 4 in the vehicle Hv. The probe data corresponds to, for example, data obtained by packaging recognition results within a predetermined time (for example, 400 milliseconds) with respect to landmarks such as lane markings, traffic signs, traffic lights, and the like. The probe data may include, for example, transmission source information, traveling trajectory information, travel path information, and feature information. The traveling trajectory information is information indicating a trajectory along which the vehicle Hv travels. The feature information indicates observation coordinates of a feature such as a landmark. The probe data may include vehicle behavior information such as a vehicle speed, a steering angle, a yaw rate, blinker operation information, and windshield wiper operation information. The probe data corresponds to material data for the server 4 to generate and update map data.

In addition, types of the applications 81 installed in the vehicle are not limited to those illustrated above. The various applications 81 may be installed in the vehicle Hv. For example, the applications 81 may include an application that provides a drive recorder function, an application that provides a function as an on board diagnostics (OBD), an autonomous driving application that provides an autonomous driving function, and the like.

For example, the autonomous driving application sequentially transmits, to the server 4 via the wireless communication device 7, a data set indicating a status inside the vehicle and a status outside the vehicle during autonomous driving as a traveling state report. The status inside the vehicle during the autonomous driving may include an operation state of the autonomous driving application and a state of the occupant. Data indicating the operation state of the autonomous driving application also includes a recognition result of a surrounding environment in the autonomous driving application, a travel plan, calculation results of a target control amount of each traveling actuator, and the like. The autonomous driving application may be configured to receive, from a predetermined server 4, data indicating a long-term travel plan or the like. The server 4 corresponding to the autonomous driving application may receive, for example, the traveling state report uploaded from the in-vehicle communication system 1, create and modify a traveling plan, and distribute the travel plan.

(Applied Vehicle)

The in-vehicle communication system 1 can be installed in various vehicles that can travel on a road, such as a two-wheel vehicle and a three-wheeled vehicle, in addition to a four-wheel vehicle. A motorized bicycle can also be included in the two-wheeled vehicle. The vehicle Hv to which the system is applied may be an owner car owned by an individual or may be a vehicle provided for a car-sharing service or a vehicle lending service. The vehicle Hv may be a service car. The service cars include a taxi, a route bus, a community bus, and the like. The service car may be a robot taxi or an unmanned operation bus, or the like on which no driver is on board. The service car may include a vehicle as an unmanned transport robot that automatically transports a package to a predetermined destination. Further, the vehicle Hv may be a remote control vehicle that is remotely operated by an operator present outside the vehicle.

(Appendix 1)

The device, the system, and the method described in the present disclosure may be implemented by a dedicated computer constituting a processor that is programmed to execute one or more functions implemented by a computer program. The device and the method described in the present disclosure may be implemented using a dedicated hardware logic circuit. Further, the device and the method described in the present disclosure may be implemented by one or more dedicated computers configured by a combination of a processor that executes a computer program and one or more hardware logic circuits. The computer program may be stored in a computer-readable non-transitory tangible recording medium as an instruction to be executed by the computer. For example, means and/or functions provided by the wireless communication device 7 and the like can be provided by software recorded in a substantial memory device, a computer executing the software, only software, only hardware, or a combination thereof. For example, a part or all of the functions of the processing unit 71 may be implemented as hardware. An aspect in which a certain function is implemented as hardware includes an aspect in which a certain function is implemented using one or more ICs or the like. The wireless communication device 7 may be implemented using an MPU, a GPU, or a data flow processor (DFP) instead of a CPU. The wireless communication device 7 may be implemented by combining multiple types of calculation processing devices such as the CPU, the MPU, and the GPU. The wireless communication device 7 may be implemented using a system-on-chip (SoC). Further, the wireless communication device 7 may be implemented using a field-programmable gate array (FPGA) or an application specific integrated circuit (ASIC). The same applies to each of the ECUs 8, the application 81, and the server 4. Various programs may be stored in a non-transitory tangible storage medium. As a storage medium of the program, various storage mediums such as a hard-disk drive (HDD), a solid state drive (SSD), a flash memory, and a secure digital (SD) card can be adopted.

(Appendix 2)

The present disclosure also includes the following configurations.

(Configuration 1)

A communication control method performed using at least one processor to control data communication between an application used in a vehicle and an external device which is a communication device present outside the vehicle, the communication control method including:

receiving a start request of communication between the application and the external device from the application (S12A);

acquiring a communication condition indicating a condition related to the data communication between the application and the external device from the application which is a request source of the start request (S101);

determining whether the communication according to the communication condition is possible based on an usage state of a communication line performed by another application (S13);

setting a communication path from the request source to the external device while securing communication bandwidth for the request source based on the determination that the communication between the request source and the external device is possible (S14); and returning, to the request source, a response message indicating whether communication according to the communication condition of the request source can be started (S15).

The above method is a method corresponding to a process flow performed by the communication control unit F3 of the wireless communication device 7. According to the above method, it is possible to assign a communication line according to the communication characteristics of each application.

(Configuration 2)

A notification control method according to the configuration 1, further comprising:

setting a communication path includes assignment of a source port number to a request source, and the notification control method includes notifying the source port number to the request source when it is determined that the communication according to the communication condition of the request source can be started and the communication path from the request source to the external device is set.

(Configuration 3)

An in-vehicle relay module that relays communication between an application used in a vehicle and a wireless communication device, the in-vehicle relay module being configured to execute steps including:
- acquiring a communication condition indicating a condition of data communication between an application and an external device (S11);
- outputting, to the wireless communication device, a communication start request including the communication condition and an application identifier, which is identification information of the application, based on an operation state of the application (S12);
- receiving, from the wireless communication device, a response message indicating whether communication according to the communication condition can be started, and notifying the application of the response message (S18, S23), in which setting a communication path includes securing a source port number for a request source; and
- when it is determined that the communication according to the communication condition cannot be started, updating the communication condition and performing a process for retransmitting a communication start request including the updated communication condition to the wireless communication device at a predetermined timing (S30).

The above-described in-vehicle relay module corresponds to the ACP client 82 in the above-described embodiment. According to the above configuration, even when data communication cannot be started immediately, the in-vehicle relay module retransmits the communication start request as needed. According to such a configuration, it is easy to assign the communication line according to the communication characteristics of each application.

What is claimed is:

1. A communication control device, which is capable of using at least one communication line and controls communication between each of a plurality of applications executed in a vehicle and an external device using the at least one communication line, the communication control device comprising at least one processor and memory configured to:
   - receive, from one of the plurality of applications, a start request of communication of data between the one of the plurality of applications and the external device;
   - acquire, from the one of the plurality of applications corresponding to a request source of the start request, a communication condition indicating a condition related to the communication of data between the one of the plurality of applications and the external device;
   - determine whether the communication of data satisfying the communication condition is possible based on a state of the at least one communication line and a communication condition of a preceding application which is another one of the plurality of applications being executed at a reception time of the start request from the request source application, using the at least one communication line assigned to the preceding application;
   - set a communication path from the request source to the external device in response to determining that the communication between the request source and the external device is possible; and
   - return information indicating a determination result of whether the communication of data satisfying the communication condition is possible to the request source, wherein
      the setting of the communication path includes assignment of a source port number to the request source, and
      the at least one processor and memory are configured to notify the request source of the source port number when it is determined that the communication of data is possible.

2. The communication control device according to claim 1, wherein,
   in response to determining that the communication of data is impossible, the at least one processor and memory are configured to return, to the request source, a message including at least one of a predicted value of a waiting time until a communication that satisfies the communication condition is possible or a communication condition possible in a current status, as an assignment impossible response indicating that the communication of data is impossible.

3. The communication control device according to claim 1, wherein,
   in response to determining that the communication of data is possible, the at least one processor and memory are configured to transmit, to the request source, a token indicating an execution right of communication together with the source port number.

4. The communication control device according to claim 1, wherein the communication condition includes information on at least one of
   - an allowable waiting time that is allowable until the communication starts;
   - an allowable delay time indicating a response delay time that is allowable;
   - a data holdable time indicating a remaining time during which transmission data is holdable in a cache region available for the application;
   - an assumed value of a data size to be transmitted or received; or
   - whether data loss is allowed.

5. The communication control device according to claim 1, wherein
   the at least one processor and memory are further configured to compare the communication condition of the request source with the communication condition of the preceding application to determine which communication of the preceding application and the request source is to be prioritized, and
   in response to determining that the communication of request source is to be prioritized, the at least one processor and memory are configured to assign, to the communication of the request source, partial or all of a communication bandwidth which has been assigned to the preceding application.

6. The communication control device according to claim 1, wherein
   the communication condition includes an allowable waiting time until the communication starts, and
   when the allowable waiting time included in the communication condition of the request source is less than a predetermined interrupt threshold, the at least one processor and memory are configured to assign, to the communication of the request source, partial or all of a communication bandwidth which has been assigned to the preceding application.

7. The communication control device according to claim 1, wherein
   the communication condition includes an allowable delay time indicating a response delay time that is allowable, the at least one processor and memory are further configured to:
observe a response delay time of the at least one communication line, and
determine that the communication, which satisfies the communication condition, is impossible when there is no communication line in which an observation value of the response delay time acquired by the at least one processor and memory is smaller than the allowable delay time included in the communication condition of the request source.

8. The communication control device according to claim 1, wherein
the communication condition includes a data holdable time indicating a remaining time during which transmission data is holdable in a cache region available for the one of the plurality of applications, and
when the data holdable time included in the communication condition of the request source is less than a predetermined interrupt threshold, the at least one processor and memory are configured to assign, to the communication of the request source, partial or all of a communication bandwidth which has been assigned to the preceding application.

9. The communication control device according to claim 1, wherein
the communication condition includes whether data loss is allowed, and
when the communication condition of the request source does not allow the data loss, the at least one processor and memory are configured to assign, to the communication of the request source, partial or all of a communication bandwidth which has been assigned to the preceding application.

10. The communication control device according to claim 1, wherein
each of the plurality of applications is assigned with an application identifier, which is predetermined identification information,
the start request includes the application identifier of the request source, and
the at least one processor and memory are further configured to manage the source port number assigned to the request source in association with an amount of data for each communication line transmitted and received using the source port number.

11. A communication control method controlling an execution state of communication performed, using at least one communication line, between an application used in a vehicle and an external device, which is a communication device located outside the vehicle, the communication control method comprising:

transmitting, from the application to a wireless communication device used in the vehicle, a start request of data communication between the application and the external device;

acquiring, by the wireless communication device, a communication condition indicating a condition related to the data communication between the application and the external device from the application which is a request source of the start request;

determining, by the wireless communication device, whether the data communication satisfying the communication condition of the request source is possible based on a state of the at least one communication line and a communication condition of a preceding application, which is another application being performed at a reception time of the start request from the request source application, using the at least one communication line assigned to the preceding application;

setting, by the wireless communication device, a communication path from the request source to the external device and setting a source port number to the request source in response to determination that the data communication between the request source and the external device is possible;

notifying, by the wireless communication device, the request source of path information including at least the source port number as information about the communication path from the request source to the external device; and performing, by the request source, cryptographic communication between the application and the external device using the source port number.

* * * * *